(12) United States Patent
Subramaniyan et al.

(10) Patent No.: US 10,567,348 B2
(45) Date of Patent: Feb. 18, 2020

(54) METHOD FOR SSL OPTIMIZATION FOR AN SSL PROXY

(71) Applicant: Citrix Systems, Inc., Fort Lauderdale, FL (US)

(72) Inventors: Moorthi Subramaniyan, Bangalore (IN); Praveen Raja Dhanabalan, Bangalore (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 259 days.

(21) Appl. No.: 15/643,263

(22) Filed: Jul. 6, 2017

(65) Prior Publication Data

US 2019/0014088 A1 Jan. 10, 2019

(51) Int. Cl.
*H04L 29/06* (2006.01)

(52) U.S. Cl.
CPC ........ *H04L 63/0281* (2013.01); *H04L 63/166* (2013.01); *H04L 65/1069* (2013.01)

(58) Field of Classification Search
None
See application file for complete search history.

(56) References Cited

U.S. PATENT DOCUMENTS

| | | | | |
|---|---|---|---|---|
| 7,103,714 B1 * | 9/2006 | Jacobs | ............... | G06F 16/9574 711/113 |
| 2004/0015725 A1 * | 1/2004 | Boneh | ................... | H04L 63/166 713/160 |
| 2008/0046727 A1 * | 2/2008 | Kanekar | ............... | H04L 63/166 713/168 |
| 2014/0067996 A1 * | 3/2014 | Zhang | ................. | H04L 63/0428 709/217 |
| 2016/0218977 A1 * | 7/2016 | Lapidous | ............ | H04L 61/1511 |
| 2016/0219018 A1 * | 7/2016 | Raman | .................... | H04L 63/02 |
| 2017/0078348 A1 * | 3/2017 | McGinnity | .......... | H04N 21/222 |

(Continued)

OTHER PUBLICATIONS

Bernat, Vincent: "Speeding up SSL: enabling session reuse | Vincent Bernat", Sep. 27, 2011 (Sep. 27, 2011), XP055233257, Retrieved from the Internet: URL:http://vincent.bernat.im/en/blog/2011-ssl-session-reuserfc5077.html [retrieved on Dec. 3, 2015].

(Continued)

*Primary Examiner* — Kaveh Abrishamkar
(74) *Attorney, Agent, or Firm* — Foley & Lardner LLP; Christopher J. McKenna; Paul M. H. Pua

(57) ABSTRACT

Described embodiments establish at least one secure connection for a session. An intermediary device may intercept a domain name service (DNS) request from a client. The device may determine, according to the intercepted DNS request and configuration data of the device, that the client is preparing to establish a session with a server. The device may send a client hello message of the device to the server for establishing a first secure connection between the device and the server for the session, prior to the client sending a client hello message of the client for establishing a second secure connection between the client and the device for the session. The second secure connection may be established between the client and the device using a specified value for a session identifier received from the server in response to the client hello message of the device.

20 Claims, 13 Drawing Sheets

(56) References Cited

U.S. PATENT DOCUMENTS

2017/0078451 A1\* 3/2017 Wills ................. H04L 47/2441
2017/0093984 A1 3/2017 Dhanabalan et al.

OTHER PUBLICATIONS

EP Examination Report for EP Appl. No. 18181599.4, dated Aug. 14, 2018.
Examination Report for EP Appl. No. 18181599.4, dated Oct. 14, 2019.

\* cited by examiner

METHOD FOR SSL OPTIMIZATION FOR AN SSL PROXY

FIELD OF THE DISCLOSURE

The present application generally relates to establishing secure socket layer (SSL) connections, including but not limited to systems and methods for optimizing SSL sessions at proxy devices.

BACKGROUND OF THE DISCLOSURE

Relative to non-SSL connections, SSL connections may be slow especially at the connection initiation phase, because of the handshaking process involved in establishing SSL connections. The potential latency arising from establishing SSL connections may be exacerbated, in the case of an client attempting to establish with a server an SSL connection via a proxy device. Such latency may hinder the client from accessing resources hosted on the server.

BRIEF SUMMARY OF THE DISCLOSURE

The present disclosure is directed towards systems and methods for establishing at least one secure connection for a session. With a proxy or intermediary deployed between a client making a request, and a server hosting the requested resource, there may be two SSL sessions that are established: one between the device and the proxy and another between the proxy and the server. Establishing each SSL session may introduce latency in creating connections among the client, the proxy, and the server, due to the corresponding handshaking processes for establishing the SSL sessions. The handshake between the client and the proxy and between the proxy and the server may each consume up to 20-200 milliseconds. Establishing the two SSL sessions in sequence (between the client and the proxy and then between the proxy and the server) may thus take up to 40-400 milliseconds or even more.

To alleviate or reduce the latency arising from establishing multiple SSL sessions, the present systems and methods provide for optimization of SSL session establishment at such similar deployed proxies by utilizing session re-use technique based on session identifiers or session tickets. The present systems and methods may leverage on a shortened handshaking process due to SSL session reuse, and/or evaluation of Domain Name System (DNS) messages. The proxy may for instance intercept a DNS request sent from a client regarding a particular server, e.g., so as to access a resource at the server. Prior to receiving a request for a SSL connection between the client and the server, the proxy may intercept and/or parse the DNS request. Based on the parsed DNS request, the proxy may determine or predict that the client is to establish a session with the server. Accordingly, the proxy may initiate establishment of a SSL session in advance of receiving a SSL connection request.

In one aspect, the present disclosure is directed to a method of establishing at least one secure connection for a session. A device intermediary between a client and a server may intercept a domain name service (DNS) request from the client. The device may determine, according to the intercepted DNS request and configuration data of the device, that the client is preparing to establish a session with the server. The device may send, responsive to the determination, a client hello message of the device to the server for establishing a first secure connection between the device and the server for the session, prior to the client sending a client hello message of the client for establishing a second secure connection between the client and the device for the session. The second secure connection between the client and the device may be established using a specified value for a session identifier received from the server in response to the client hello message of the device.

In some embodiments, the device may determine that the client is preparing to establish a session with the server by parsing the intercepted DNS request for information and comparing the information with the configuration data of the device. In some embodiments, establishing the second secure connection may include performing an abbreviated secure socket layer (SSL) handshake to establish the second secure connection between the client and the device. In some embodiments, performing the abbreviated SSL handshake may include allowing the device to avoid transmitting a SSL certificate of the device to the client for validation.

In some embodiments, the configuration data may include at least one of: a SSL profile of the client or the server, or historical data gathered about connections of the client or the server. In some embodiments, sending the client hello message of the device may include sending the client hello message of the device with an empty or null value for the session identifier, to cause the server to set the session identifier to the specified value.

In some embodiments, the device may receive the specified value of the session identifier from the server, prior to or at a time the client hello message of the client is received at the device. In some embodiments, the second secure connection may be established between the client and the device using a session ticket that comprises a session state of the first secure connection. In some embodiments, the device may establish the first secure connection using the specified value for the session identifier received from the server. In some embodiments, establishing the second secure connection may further include establishing the second secure connection by reusing the first secure connection established between the device and the server.

In another aspect, the present disclosure is directed to a system for establishing at least one secure connection for a session. The system may include a device intermediary between a client and a server. The device may intercept a domain name service (DNS) request from the client. The device may determine, according to the intercepted DNS request and the configuration data of the device, that the client is preparing to establish a session with the server. The device may send, responsive to the determination, a client hello message of the device to the server for establishing a first secure connection between the device and the server for the session, prior to the client sending a client hello message of the client for establishing a second secure connection between the client and the device for the session. The device may establish the second secure connection between the client and the device using a specified value for a session identifier received from the server in response to the client hello message of the device.

In some embodiments, the device may parse the intercepted DNS request for information, and to compare the information with the configuration data of the device. In some embodiments, the device may establish the second secure connection by performing an abbreviated secure socket layer (SSL) handshake. In some embodiments, the device may perform the abbreviated SSL handshake by avoiding to have the device to transmit a SSL certificate of the device to the client for validation.

In some embodiments, the configuration data may include at least one of: a SSL profile of the client or the server, or historical data gathered about connections of the client or the server. In some embodiments, the device may send the client hello message of the device with an empty or null value for the session identifier, to cause the server to set the session identifier to the specified value.

In some embodiments, the device may receive the specified value of the session identifier from the server, prior to or at a time the client hello message of the client is received at the device. In some embodiments, the device may establish the second secure connection between the client and the device using a session ticket that comprises a session state of the first secure connection. In some embodiments, the device may establish the first secure connection using the specified value for the session identifier received from the server. In some embodiments, the device may establish the second secure connection by reusing the first secure connection established between the device and the server.

BRIEF DESCRIPTION OF THE FIGURES

The foregoing and other objects, aspects, features, and advantages of the present solution will become more apparent and better understood by referring to the following description taken in conjunction with the accompanying drawings, in which.

Figure 1A:
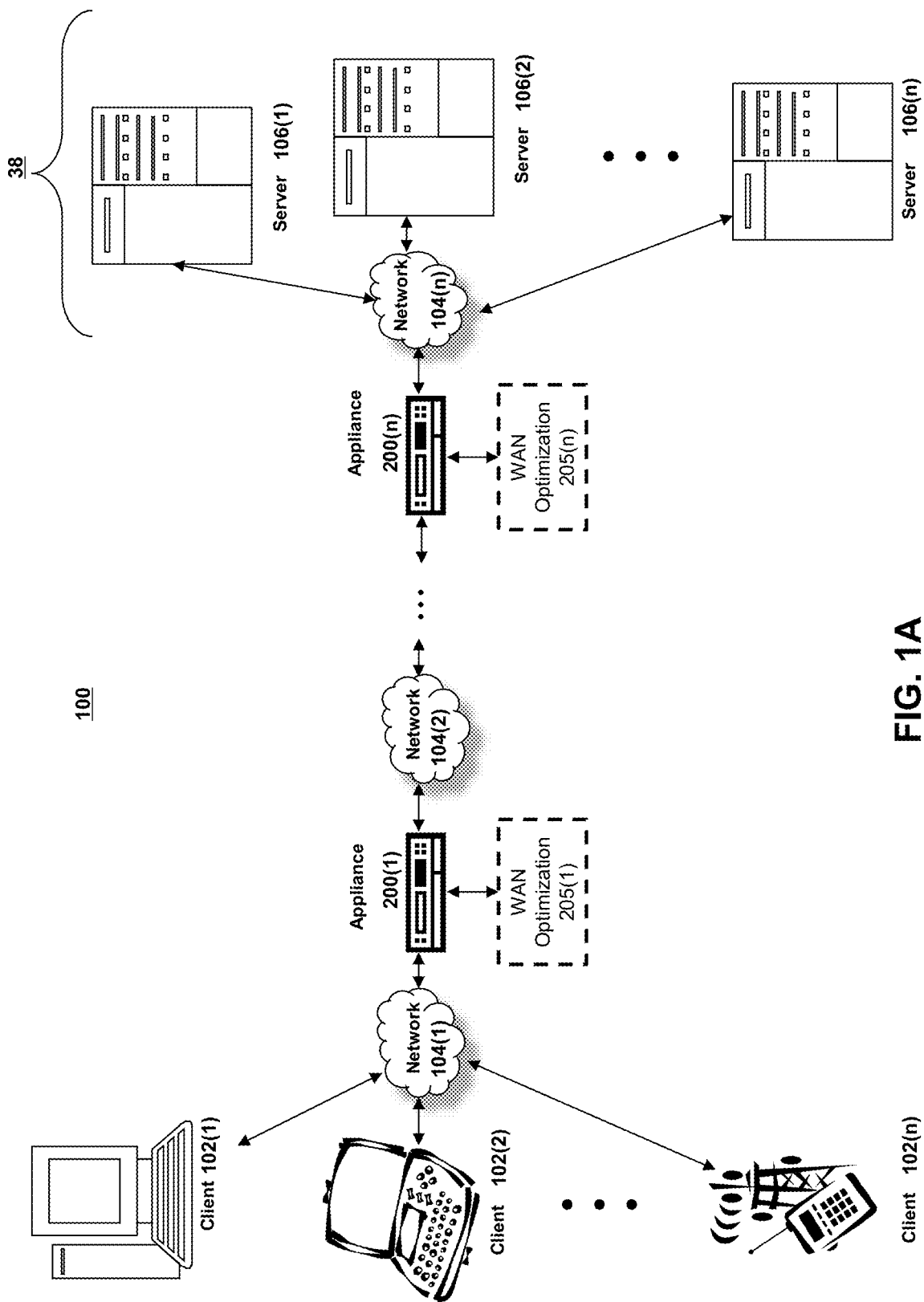
FIG. 1A is a block diagram of a network computing system, in accordance with an illustrative embodiment.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for virtualizing an application delivery controller;

Section D describes embodiments of systems and methods for providing a clustered appliance architecture environment;

Section E describes embodiments of systems and methods for efficient SSL handshake processing;

Section F describes embodiments of systems and methods for policy driven fine grain validation of a SSL certificate of a server for clientless VPN access; and Section G describes embodiments of systems and methods for establishing at least one secure connection for a session.

A. Network and Computing Environment

Referring to FIG. 1A, an illustrative network environment 100 is depicted. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104n (generally referred to as network(s) 104). In some embodiments, a client 102 may communicate with a server 106 via one or more appliances 200(1)-200n (generally referred to as appliance(s) 200 or gateway(s) 200).

Although the embodiment shown in FIG. 1A shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 1A, one or more appliances 200 may be located at various points or in various communication paths of network environment 100. For example, appliance 200 may be deployed between two networks 104(1) and 104(2), and appliances 200 may communicate with one another to work in conjunction to, for example, accelerate network traffic between clients 102 and servers 106. In other embodiments, the appliance 200 may be located on a network 104. For example, appliance 200 may be implemented as part of one of clients 102 and/or servers 106. In an embodiment, appliance 200 may be implemented as a network device such as NetScaler® products sold by Citrix Systems, Inc. of Fort Lauderdale, Fla.

As shown in FIG. 1A, one or more servers 106 may operate as a server farm 38. Servers 106 of server farm 38 may be logically grouped, and may either be geographically co-located (e.g., on premises) or geographically dispersed (e.g., cloud based) from clients 102 and/or other servers 106. In an embodiment, server farm 38 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 1A, in some embodiments, appliances 200 may include, be replaced by, or be in communication with, one or more additional appliances, such as WAN optimization appliances 205(1)-205(n), referred to generally as WAN optimization appliance(s) 205. For example, WAN optimization appliance 205 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 205 may be a performance enhancing proxy or a WAN optimization controller. In one embodiment, appliance 205 may be implemented as Cloud-Bridge® products sold by Citrix Systems, Inc. of Fort Lauderdale, Fla.

Figure 1B:
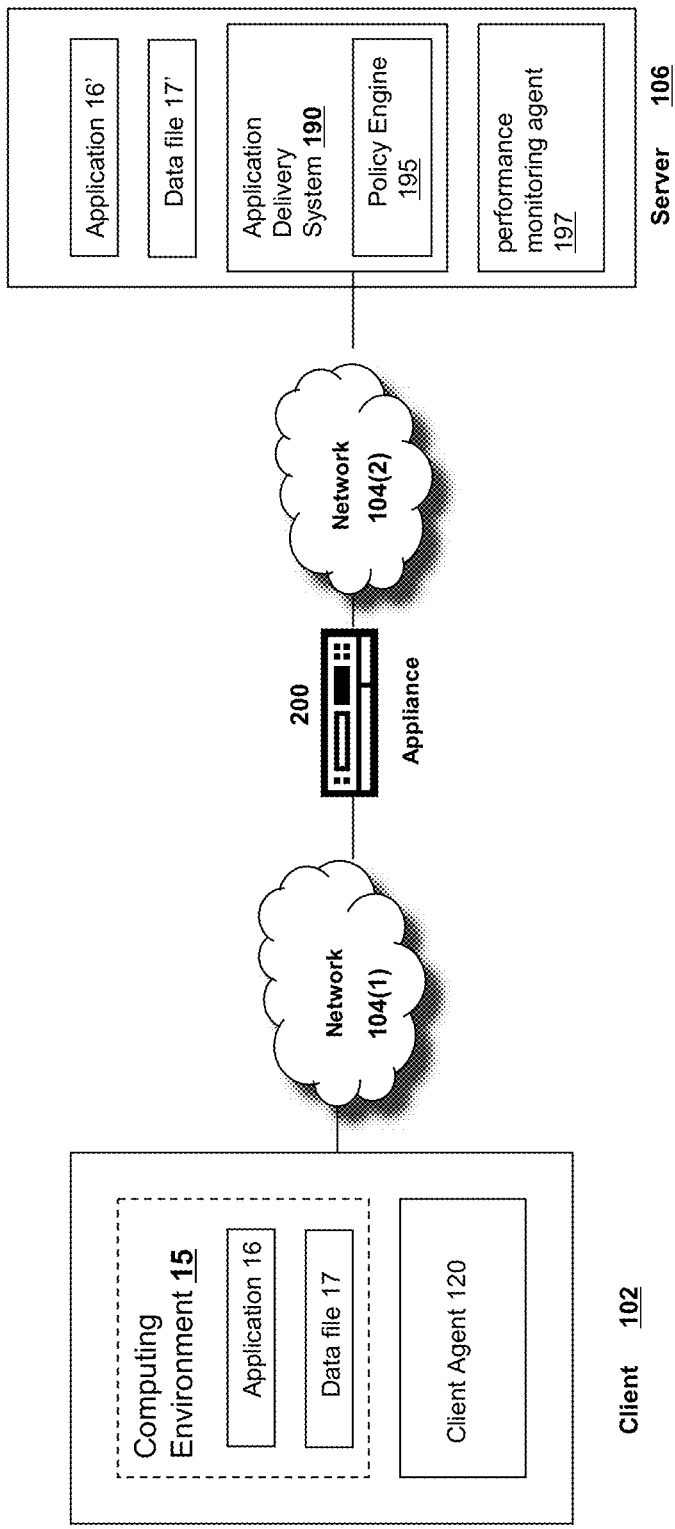
FIG. 1B is a block diagram of a network computing system for delivering a computing environment from a server to a client via an appliance, in accordance with an illustrative embodiment.

Referring to FIG. 1B, an example network environment, 100', for delivering and/or operating a computing network environment on a client 102 is shown. As shown in FIG. 1B, a server 106 may include an application delivery system 190 for delivering a computing environment, application, and/or data files to one or more clients 102. Client 102 may include client agent 120 and computing environment 15. Computing environment 15 may execute or operate an application, 16, that accesses, processes or uses a data file 17. Computing environment 15, application 16 and/or data file 17 may be delivered via appliance 200 and/or the server 106.

Appliance 200 may accelerate delivery of all or a portion of computing environment 15 to a client 102, for example by the application delivery system 190. For example, appliance 200 may accelerate delivery of a streaming application and data file processable by the application from a data center to a remote user location by accelerating transport layer traffic between a client 102 and a server 106. Such acceleration may be provided by one or more techniques, such as: 1) transport layer connection pooling, 2) transport layer connection multiplexing, 3) transport control protocol buffering, 4) compression, 5) caching, or other techniques. Appliance 200 may also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations.

Application delivery management system 190 may deliver computing environment 15 to a user (e.g., client 102), remote or otherwise, based on authentication and authorization policies applied by policy engine 195. A remote user may obtain a computing environment and access to server stored applications and data files from any network-connected device (e.g., client 102). For example, appliance 200 may request an application and data file from server 106. In response to the request, application delivery system 190 and/or server 106 may deliver the application and data file to client 102, for example via an application stream to operate in computing environment 15 on client 102, or via a remote-display protocol or otherwise via remote-based or server-based computing. In an embodiment, application delivery system 190 may be implemented as any portion of the Citrix Workspace Suite™ by Citrix Systems, Inc., such as XenApp® or XenDesktop®.

Policy engine 195 may control and manage the access to, and execution and delivery of, applications. For example, policy engine 195 may determine the one or more applications a user or client 102 may access and/or how the application should be delivered to the user or client 102, such as a server-based computing, streaming or delivering the application locally to the client 120 for local execution.

For example, in operation, a client 102 may request execution of an application (e.g., application 16') and application delivery system 190 of server 106 determines how to execute application 16', for example based upon credentials received from client 102 and a user policy applied by policy engine 195 associated with the credentials. For example, application delivery system 190 may enable client 102 to receive application-output data generated by execution of the application on a server 106, may enable client 102 to execute the application locally after receiving the application from server 106, or may stream the application via network 104 to client 102. For example, in some embodiments, the application may be a server-based or a remote-based application executed on server 106 on behalf of client 102. Server 106 may display output to client 102 using a thin-client or remote-display protocol, such as the Independent Computing Architecture (ICA) protocol by Citrix Systems, Inc. of Fort Lauderdale, Fla. The application may be any application related to real-time data communications, such as applications for streaming graphics, streaming video and/or audio or other data, delivery of remote desktops or workspaces or hosted services or applications, for example infrastructure as a service (IaaS), workspace as a service (WaaS), software as a service (SaaS) or platform as a service (PaaS).

One or more of servers 106 may include a performance monitoring service or agent 197. In some embodiments, a dedicated one or more servers 106 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on clients 102 (e.g., client agent 120), servers 106 (e.g., agent 197) or an appliances 200 and/or 205 (agent not shown). In general, monitoring agents (e.g., 120 and/or 197) execute transparently (e.g., in the background) to any application and/or user of the device. In some embodiments, monitoring agent 197 includes any of the product embodiments referred to as EdgeSight by Citrix Systems, Inc. of Fort Lauderdale, Fla.

The monitoring agents may monitor, measure, collect, and/or analyze data on a predetermined frequency, based upon an occurrence of given event(s), or in real time during operation of network environment 100. The monitoring agents may monitor resource consumption and/or performance of hardware, software, and/or communications resources of clients 102, networks 104, appliances 200 and/or 205, and/or servers 106. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents may provide application performance management for application delivery system 190. For example, based upon one or more monitored performance conditions or metrics, application delivery system 190 may be dynamically adjusted, for example periodically or in real-time, to optimize application delivery by servers 106 to clients 102 based upon network environment performance and conditions.

In described embodiments, clients 102, servers 106, and appliances 200 and 205 may be deployed as and/or executed on any type and form of computing device, such as any desktop computer, laptop computer, or mobile device capable of communication over at least one network and performing the operations described herein. For example, clients 102, servers 106 and/or appliances 200 and 205 may each correspond to one computer, a plurality of computers, or a network of distributed computers such as computer 101 shown in FIG. 1C.

Figure 1C:
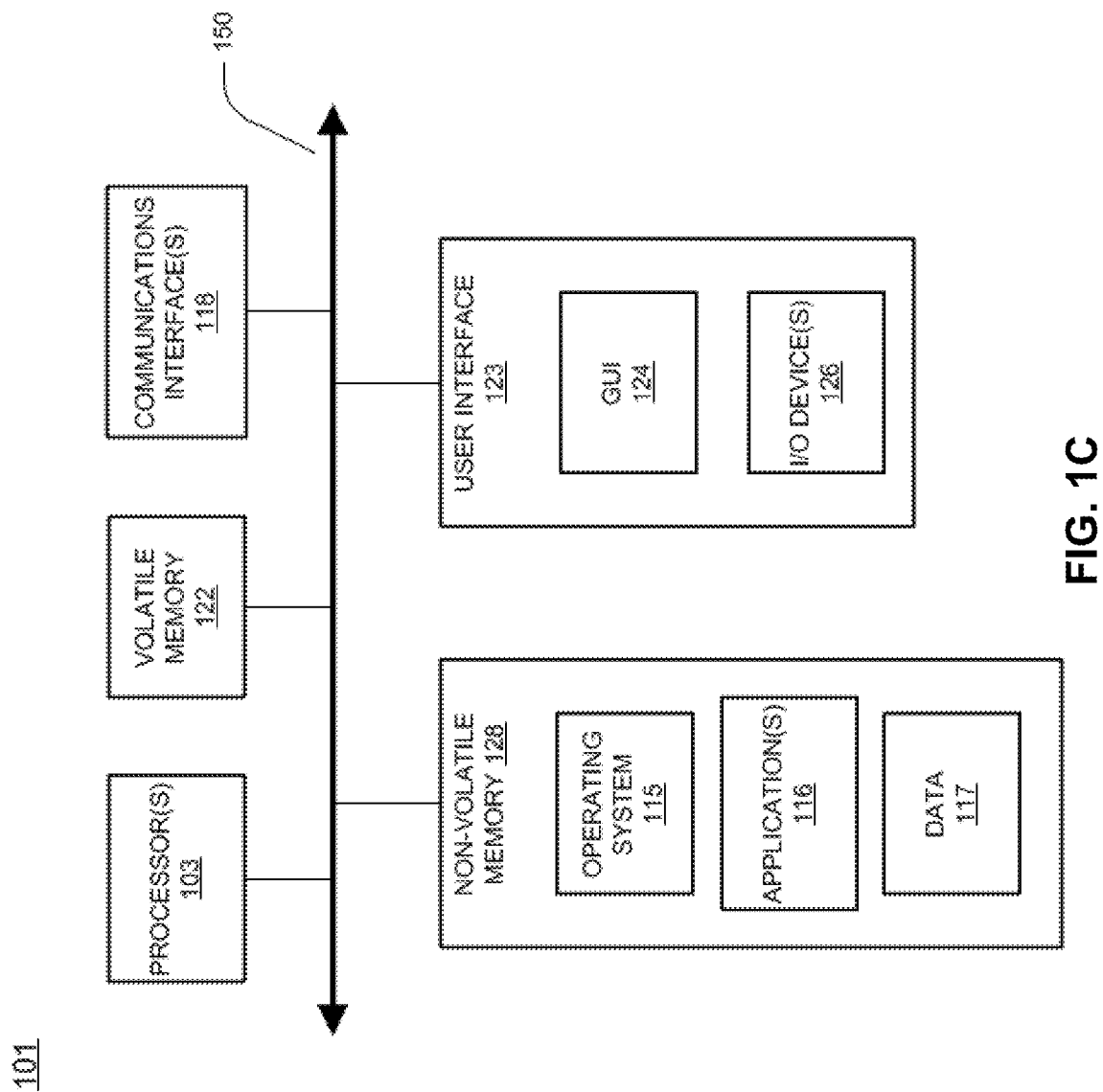
FIG. 1C is a block diagram of a computing device, in accordance with an illustrative embodiment.

As shown in FIG. 1C, computer 101 may include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, etc.). Non-volatile memory 128 stores operating system 115, one or more applications 116, and data 117 such that, for example, computer instructions of operating system 115 and/or applications 116 are executed by processor(s) 103 out of volatile memory 122. Data may be entered using an input device of GUI 124 or received from I/O device(s) 126. Various elements of computer 101 may communicate via communication bus 150. Computer 101 as shown in FIG. 1C is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, a first computing device 101 may execute an application on behalf of a user of a client computing device (e.g., a client 102), may execute a virtual machine, which provides an execution session within which applications execute on behalf of a user or a client computing device (e.g., a client 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

Additional details of the implementation and operation of network environment 100, clients 102, servers 106, and appliances 200 and 205 may be as described in U.S. Pat. No. 9,538,345, issued Jan. 3, 2017 to Citrix Systems, Inc. of Fort Lauderdale, Fla., the teachings of which are hereby incorporated herein by reference.

B. Appliance Architecture

Figure 2:
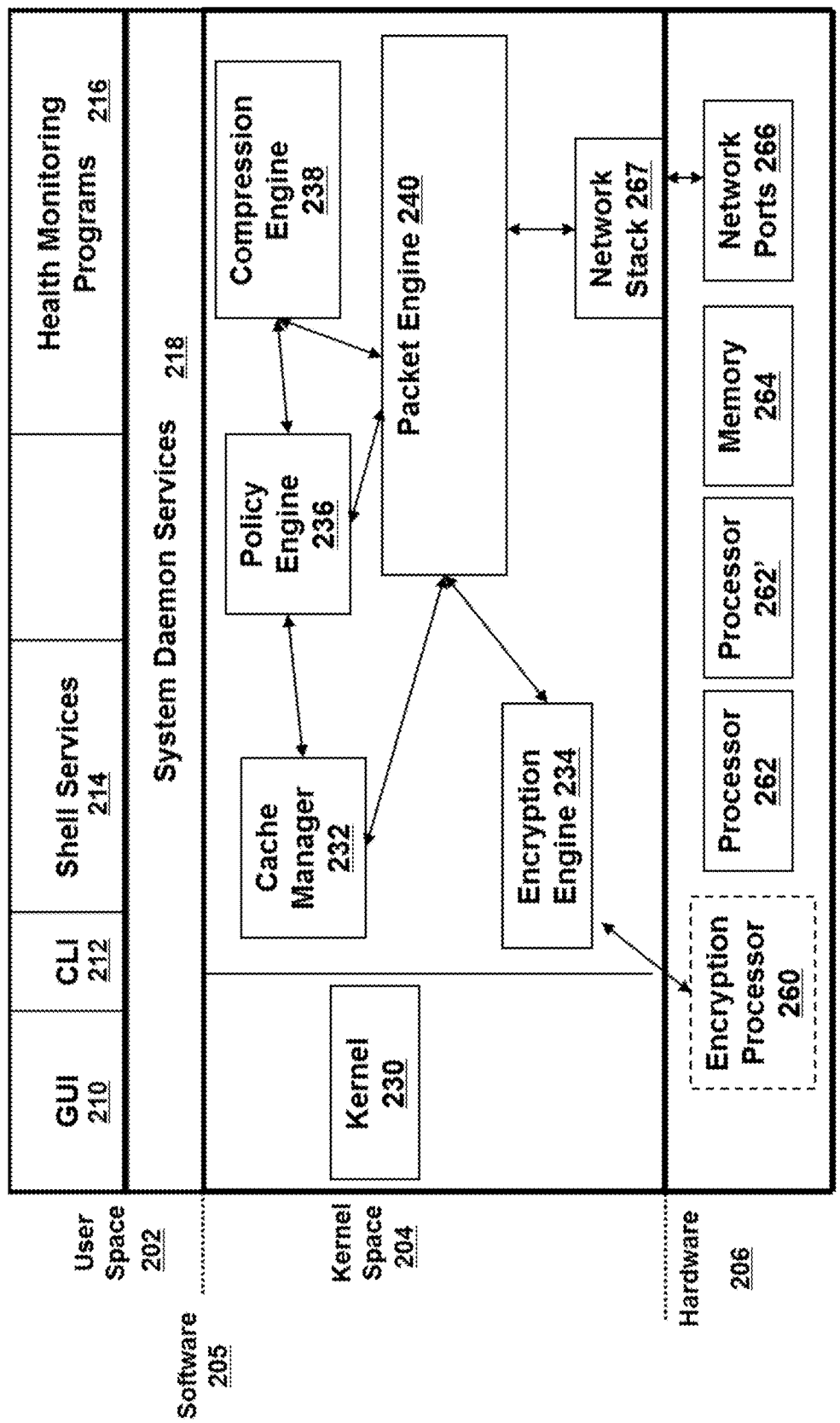
FIG. 2 is a block diagram of an appliance for processing communications between a client and a server, in accordance with an illustrative embodiment.

FIG. 2 shows an example embodiment of appliance 200. As described herein, appliance 200 may be implemented as a server, gateway, router, switch, bridge or other type of computing or network device. As shown in FIG. 2, an embodiment of appliance 200 may include a hardware layer 206 and a software layer 205 divided into a user space 202 and a kernel space 204. Hardware layer 206 provides the hardware elements upon which programs and services within kernel space 204 and user space 202 are executed and allow programs and services within kernel space 204 and user space 202 to communicate data both internally and externally with respect to appliance 200. As shown in FIG. 2, hardware layer 206 may include one or more processing units 262 for executing software programs and services, memory 264 for storing software and data, network ports 266 for transmitting and receiving data over a network, and encryption processor 260 for encrypting and decrypting data such as in relation to Secure Socket Layer (SSL) or Transport Layer Security (TLS) processing of data transmitted and received over the network.

An operating system of appliance 200 allocates, manages, or otherwise segregates the available system memory into kernel space 204 and user space 202. Kernel space 204 is reserved for running kernel 230, including any device drivers, kernel extensions or other kernel related software. As known to those skilled in the art, kernel 230 is the core of the operating system, and provides access, control, and management of resources and hardware-related elements of application 104. Kernel space 204 may also include a number of network services or processes working in conjunction with cache manager 232.

Appliance 200 may include one or more network stacks 267, such as a TCP/IP based stack, for communicating with client(s) 102, server(s) 106, network(s) 104, and/or other appliances 200 or 205. For example, appliance 200 may establish and/or terminate one or more transport layer connections between clients 102 and servers 106. Each network stack 267 may include a buffer 243 for queuing one or more network packets for transmission by appliance 200.

Kernel space 204 may include cache manager 232, packet engine 240, encryption engine 234, policy engine 236 and compression engine 238. In other words, one or more of processes 232, 240, 234, 236 and 238 run in the core address space of the operating system of appliance 200, which may reduce the number of data transactions to and from the memory and/or context switches between kernel mode and user mode, for example since data obtained in kernel mode may not need to be passed or copied to a user process, thread or user level data structure.

Cache manager 232 may duplicate original data stored elsewhere or data previously computed, generated or transmitted to reducing the access time of the data. In some embodiments, the cache memory may be a data object in memory 264 of appliance 200, or may be a physical memory having a faster access time than memory 264.

Policy engine 236 may include a statistical engine or other configuration mechanism to allow a user to identify, specify, define or configure a caching policy and access, control and management of objects, data or content being cached by appliance 200, and define or configure security, network traffic, network access, compression or other functions performed by appliance 200.

Encryption engine 234 may process any security related protocol, such as SSL or TLS. For example, encryption engine 234 may encrypt and decrypt network packets, or any portion thereof, communicated via appliance 200, may setup or establish SSL, TLS or other secure connections, for example between client 102, server 106, and/or other appliances 200 or 205. In some embodiments, encryption engine 234 may use a tunneling protocol to provide a VPN between a client 102 and a server 106. In some embodiments, encryption engine 234 is in communication with encryption processor 260. Compression engine 238 compresses network packets bi-directionally between clients 102 and servers 106 and/or between one or more appliances 200.

Packet engine 240 may manage kernel-level processing of packets received and transmitted by appliance 200 via network stacks 267 to send and receive network packets via network ports 266. Packet engine 240 may operate in conjunction with encryption engine 234, cache manager 232, policy engine 236 and compression engine 238, for example to perform encryption/decryption, traffic management such as request-level content switching and request-level cache redirection, and compression and decompression of data.

User space 202 is a memory area or portion of the operating system used by user mode applications or programs otherwise running in user mode. A user mode application may not access kernel space 204 directly and uses service calls in order to access kernel services. User space 202 may include graphical user interface (GUI) 210, a command line interface (CLI) 212, shell services 214, health monitor 216, and daemon services 218. GUI 210 and CLI 212 enable a system administrator or other user to interact with and control the operation of appliance 200, such as via the operating system of appliance 200. Shell services 214 include the programs, services, tasks, processes or executable instructions to support interaction with appliance 200 by a user via the GUI 210 and/or CLI 212.

Health monitor 216 monitors, checks, reports and ensures that network systems are functioning properly and that users are receiving requested content over a network, for example by monitoring activity of appliance 200. In some embodiments, health monitor 216 intercepts and inspects any network traffic passed via appliance 200. For example, health monitor 216 may interface with one or more of encryption engine 234, cache manager 232, policy engine 236, compression engine 238, packet engine 240, daemon services 218, and shell services 214 to determine a state, status, operating condition, or health of any portion of the appliance 200. Further, health monitor 216 may determine if a program, process, service or task is active and currently running, check status, error or history logs provided by any program, process, service or task to determine any condition, status or error with any portion of appliance 200. Additionally, health monitor 216 may measure and monitor the performance of any application, program, process, service, task or thread executing on appliance 200.

Daemon services 218 are programs that run continuously or in the background and handle periodic service requests received by appliance 200. In some embodiments, a daemon service may forward the requests to other programs or processes, such as another daemon service 218 as appropriate.

As described herein, appliance 200 may relieve servers 106 of much of the processing load caused by repeatedly opening and closing transport layers connections to clients 102 by opening one or more transport layer connections with each server 106 and maintaining these connections to allow repeated data accesses by clients via the Internet (e.g., "connection pooling"). To perform connection pooling, appliance 200 may translate or multiplex communications by modifying sequence numbers and acknowledgment numbers at the transport layer protocol level (e.g., "connection multiplexing"). Appliance 200 may also provide switching or load balancing for communications between the client 102 and server 106.

As described herein, each client 102 may include client agent 120 for establishing and exchanging communications with appliance 200 and/or server 106 via a network 104. Client 102 may have installed and/or execute one or more applications that are in communication with network 104. Client agent 120 may intercept network communications from a network stack used by the one or more applications. For example, client agent 120 may intercept a network communication at any point in a network stack and redirect the network communication to a destination desired, managed or controlled by client agent 120, for example to intercept and redirect a transport layer connection to an IP address and port controlled or managed by client agent 120. Thus, client agent 120 may transparently intercept any protocol layer below the transport layer, such as the network layer, and any protocol layer above the transport layer, such as the session, presentation or application layers. Client agent 120 can interface with the transport layer to secure, optimize, accelerate, route or load-balance any communications provided via any protocol carried by the transport layer.

In some embodiments, client agent 120 is implemented as an Independent Computing Architecture (ICA) client developed by Citrix Systems, Inc. of Fort Lauderdale, Fla. Client agent 120 may perform acceleration, streaming, monitoring, and/or other operations. For example, client agent 120 may accelerate streaming an application from a server 106 to a client 102. Client agent 120 may also perform end-point detection/scanning and collect end-point information about client 102 for appliance 200 and/or server 106. Appliance 200 and/or server 106 may use the collected information to determine and provide access, authentication and authorization control of the client's connection to network 104. For example, client agent 120 may identify and determine one or more client-side attributes, such as: the operating system and/or a version of an operating system, a service pack of the operating system, a running service, a running process, a file, presence or versions of various applications of the client, such as antivirus, firewall, security, and/or other software.

Additional details of the implementation and operation of appliance 200 may be as described in U.S. Pat. No. 9,538,345, issued Jan. 3, 2017 to Citrix Systems, Inc. of Fort Lauderdale, Fla., the teachings of which are hereby incorporated herein by reference.

C. Systems and Methods for Providing Virtualized Application Delivery Controller Referring now to FIG. 3, a block diagram of a virtualized environment 400 is shown. As shown, a computing device 402 in virtualized environment 400 includes a virtualization layer 403, a hypervisor layer 404, and a hardware layer 407. Hypervisor layer 404 includes one or more hypervisors (or virtualization managers) 401 that allocates and manages access to a number of physical resources in hardware layer 407 (e.g., physical processor(s) 421 and physical disk(s) 428) by at least one virtual machine (VM) (e.g., one of VMs 406) executing in virtualization layer 403. Each VM 406 may include allocated virtual resources such as virtual processors 432 and/or virtual disks 442, as well as virtual resources such as virtual memory and virtual network interfaces. In some embodiments, at least one of VMs 406 may include a control operating system (e.g., 405) in communication with hypervisor 401 and used to execute applications for managing and configuring other VMs (e.g., guest operating systems 410) on device 402.

In general, hypervisor(s) 401 may provide virtual resources to an operating system of VMs 406 in any manner that simulates the operating system having access to a physical device. Thus, hypervisor(s) 401 may be used to emulate virtual hardware, partition physical hardware, virtualize physical hardware, and execute virtual machines that provide access to computing environments. In an illustrative embodiment, hypervisor(s) 401 may be implemented as a XEN hypervisor, for example as provided by the open source Xen.org community. In an illustrative embodiment, device 402 executing a hypervisor that creates a virtual machine platform on which guest operating systems may execute is referred to as a host server. In such an embodiment, device 402 may be implemented as a XEN server as provided by Citrix Systems, Inc., of Fort Lauderdale, Fla.

Hypervisor 401 may create one or more VMs 406 in which an operating system (e.g., control operating system 405 and/or guest operating system 410) executes. For example, the hypervisor 401 loads a virtual machine image to create VMs 406 to execute an operating system. Hypervisor 401 may present VMs 406 with an abstraction of hardware layer 407, and/or may control how physical capabilities of hardware layer 407 are presented to VMs 406. For example, hypervisor(s) 401 may manage a pool of resources distributed across multiple physical computing devices.

In some embodiments, one of VMs 406 (e.g., the VM executing control operating system 405) may manage and configure other of VMs 406, for example by managing the execution and/or termination of a VM and/or managing allocation of virtual resources to a VM. In various embodiments, VMs may communicate with hypervisor(s) 401 and/ or other VMs via, for example, one or more Application Programming Interfaces (APIs), shared memory, and/or other techniques.

In general, VMs 406 may provide a user of device 402 with access to resources within virtualized computing environment 400, for example, one or more programs, applications, documents, files, desktop and/or computing environments, or other resources. In some embodiments, VMs 406 may be implemented as fully virtualized VMs that are not aware that they are virtual machines (e.g., a Hardware Virtual Machine or HVM). In other embodiments, the VM may be aware that it is a virtual machine, and/or the VM may be implemented as a paravirtualized (PV) VM.

Figure 3:
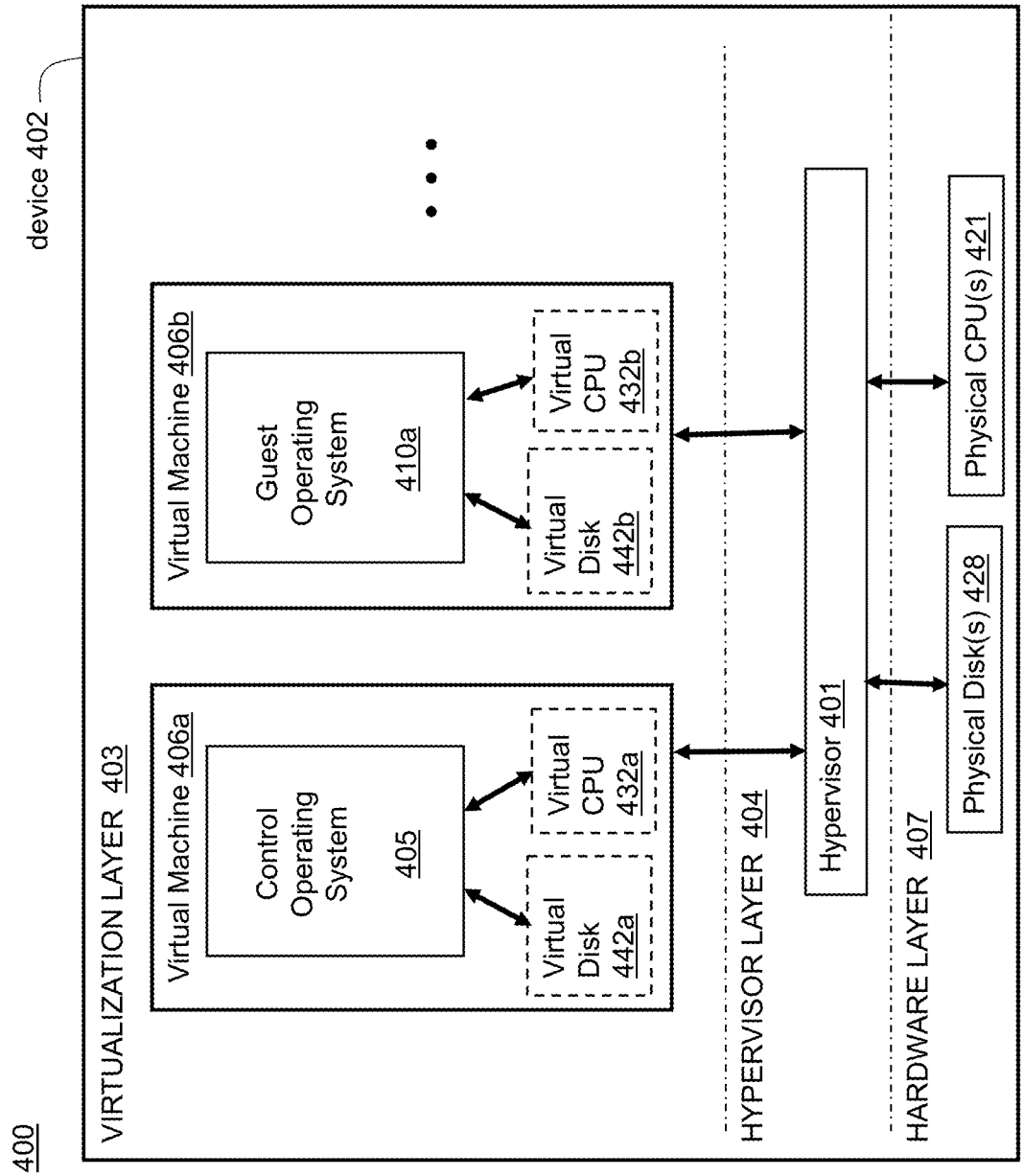
FIG. 3 is a block diagram of a virtualization environment, in accordance with an illustrative embodiment.

Although shown in FIG. 3 as including a single virtualized device 402, virtualized environment 400 may include a plurality of networked devices in a system in which at least one physical host executes a virtual machine. A device on which a VM executes may be referred to as a physical host and/or a host machine. For example, appliance 200 may be additionally or alternatively implemented in a virtualized environment 400 on any computing device, such as a client 102, server 106 or appliance 200. Virtual appliances may provide functionality for availability, performance, health monitoring, caching and compression, connection multiplexing and pooling and/or security processing (e.g., firewall, VPN, encryption/decryption, etc.), similarly as described in regard to appliance 200.

Additional details of the implementation and operation of virtualized computing environment 400 may be as described in U.S. Pat. No. 9,538,345, issued Jan. 3, 2017 to Citrix Systems, Inc. of Fort Lauderdale, Fla., the teachings of which are hereby incorporated herein by reference.

In some embodiments, a server may execute multiple virtual machines 406, for example on various cores of a multi-core processing system and/or various processors of a multiple processor device. For example, although generally shown herein as "processors" (e.g., in FIGS. 1C, 2 and 3), one or more of the processors may be implemented as either single- or multi-core processors to provide a multi-threaded, parallel architecture and/or multi-core architecture. Each processor and/or core may have or use memory that is allocated or assigned for private or local use that is only accessible by that processor/core, and/or may have or use memory that is public or shared and accessible by multiple processors/cores. Such architectures may allow work, task, load or network traffic distribution across one or more processors and/or one or more cores (e.g., by functional parallelism, data parallelism, flow-based data parallelism, etc.).

Further, instead of (or in addition to) the functionality of the cores being implemented in the form of a physical processor/core, such functionality may be implemented in a virtualized environment (e.g., 400) on a client 102, server 106 or appliance 200, such that the functionality may be implemented across multiple devices, such as a cluster of computing devices, a server farm or network of computing devices, etc. The various processors/cores may interface or communicate with each other using a variety of interface techniques, such as core to core messaging, shared memory, kernel APIs, etc.

In embodiments employing multiple processors and/or multiple processor cores, described embodiments may distribute data packets among cores or processors, for example to balance the flows across the cores. For example, packet distribution may be based upon determinations of functions performed by each core, source and destination addresses, and/or whether: a load on the associated core is above a predetermined threshold; the load on the associated core is below a predetermined threshold; the load on the associated core is less than the load on the other cores; or any other metric that can be used to determine where to forward data packets based in part on the amount of load on a processor.

For example, data packets may be distributed among cores or processes using receive-side scaling (RSS) in order to process packets using multiple processors/cores in a network. RSS generally allows packet processing to be balanced across multiple processors/cores while maintaining in-order delivery of the packets. In some embodiments, RSS may use a hashing scheme to determine a core or processor for processing a packet.

The RSS may generate hashes from any type and form of input, such as a sequence of values. This sequence of values can include any portion of the network packet, such as any header, field or payload of network packet, and include any tuples of information associated with a network packet or data flow, such as addresses and ports. The hash result or any portion thereof may be used to identify a processor, core, engine, etc., for distributing a network packet, for example via a hash table, indirection table, or other mapping technique.

Additional details of the implementation and operation of a multi-processor and/or multi-core system may be as described in U.S. Pat. No. 9,538,345, issued Jan. 3, 2017 to Citrix Systems, Inc. of Fort Lauderdale, Fla., the teachings of which are hereby incorporated herein by reference.

D. Systems and Methods for Providing a Distributed Cluster Architecture

Figure 4:
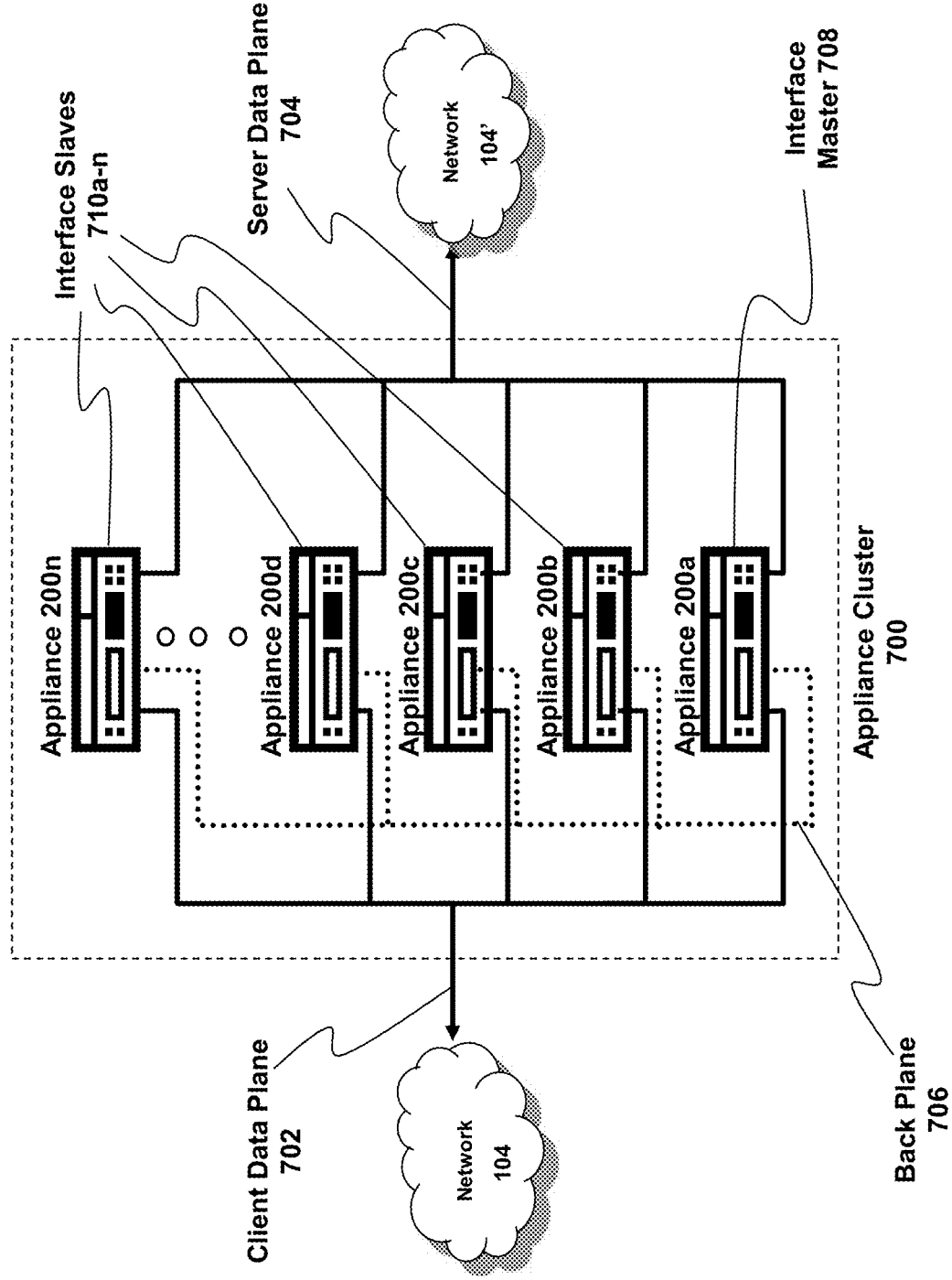
FIG. 4 is a block diagram of a cluster system, in accordance with an illustrative embodiment.

Although shown in FIGS. 1A and 1B as being single appliances, appliances 200 may be implemented as one or more distributed or clustered appliances. Individual computing devices or appliances may be referred to as nodes of the cluster. A centralized management system may perform load balancing, distribution, configuration, or other tasks to allow the nodes to operate in conjunction as a single computing system. Such a cluster may be viewed as a single virtual appliance or computing device. FIG. 4 shows a block diagram of an illustrative computing device cluster or appliance cluster 600. A plurality of appliances 200 or other computing devices (e.g., nodes) may be joined into a single cluster 600. Cluster 600 may operate as an application server, network storage server, backup service, or any other type of computing device to perform many of the functions of appliances 200 and/or 205.

In some embodiments, each appliance 200 of cluster 600 may be implemented as a multi-processor and/or multi-core appliance, as described herein. Such embodiments may employ a two-tier distribution system, with one appliance if the cluster distributing packets to nodes of the cluster, and each node distributing packets for processing to processors/cores of the node. In many embodiments, one or more of appliances 200 of cluster 600 may be physically grouped or geographically proximate to one another, such as a group of blade servers or rack mount devices in a given chassis, rack, and/or data center. In some embodiments, one or more of appliances 200 of cluster 600 may be geographically distributed, with appliances 200 not physically or geographically co-located. In such embodiments, geographically remote appliances may be joined by a dedicated network connection and/or VPN. In geographically distributed embodiments, load balancing may also account for communications latency between geographically remote appliances.

In some embodiments, cluster 600 may be considered a virtual appliance, grouped via common configuration, management, and purpose, rather than as a physical group. For example, an appliance cluster may comprise a plurality of virtual machines or processes executed by one or more servers.

As shown in FIG. 4, appliance cluster 600 may be coupled to a first network 104(1) via client data plane 602, for example to transfer data between clients 102 and appliance cluster 600. Client data plane 602 may be implemented a switch, hub, router, or other similar network device internal or external to cluster 600 to distribute traffic across the nodes of cluster 600. For example, traffic distribution may be performed based on equal-cost multi-path (ECMP) routing with next hops configured with appliances or nodes of the cluster, open-shortest path first (OSPF), stateless hash-based traffic distribution, link aggregation (LAG) protocols, or any other type and form of flow distribution, load balancing, and routing.

Appliance cluster 600 may be coupled to a second network 104(2) via server data plane 604. Similarly to client data plane 602, server data plane 604 may be implemented as a switch, hub, router, or other network device that may be internal or external to cluster 600. In some embodiments, client data plane 602 and server data plane 604 may be merged or combined into a single device.

In some embodiments, each appliance 200 of cluster 600 may be connected via an internal communication network or back plane 606. Back plane 606 may enable inter-node or inter-appliance control and configuration messages, for inter-node forwarding of traffic, and/or for communicating configuration and control traffic from an administrator or user to cluster 600. In some embodiments, back plane 606 may be a physical network, a VPN or tunnel, or a combination thereof.

Additional details of cluster 600 may be as described in U.S. Pat. No. 9,538,345, issued Jan. 3, 2017 to Citrix Systems, Inc. of Fort Lauderdale, Fla., the teachings of which are hereby incorporated herein by reference.

E. Systems and Methods for Efficient SSL Handshake Processing

Figure 5:
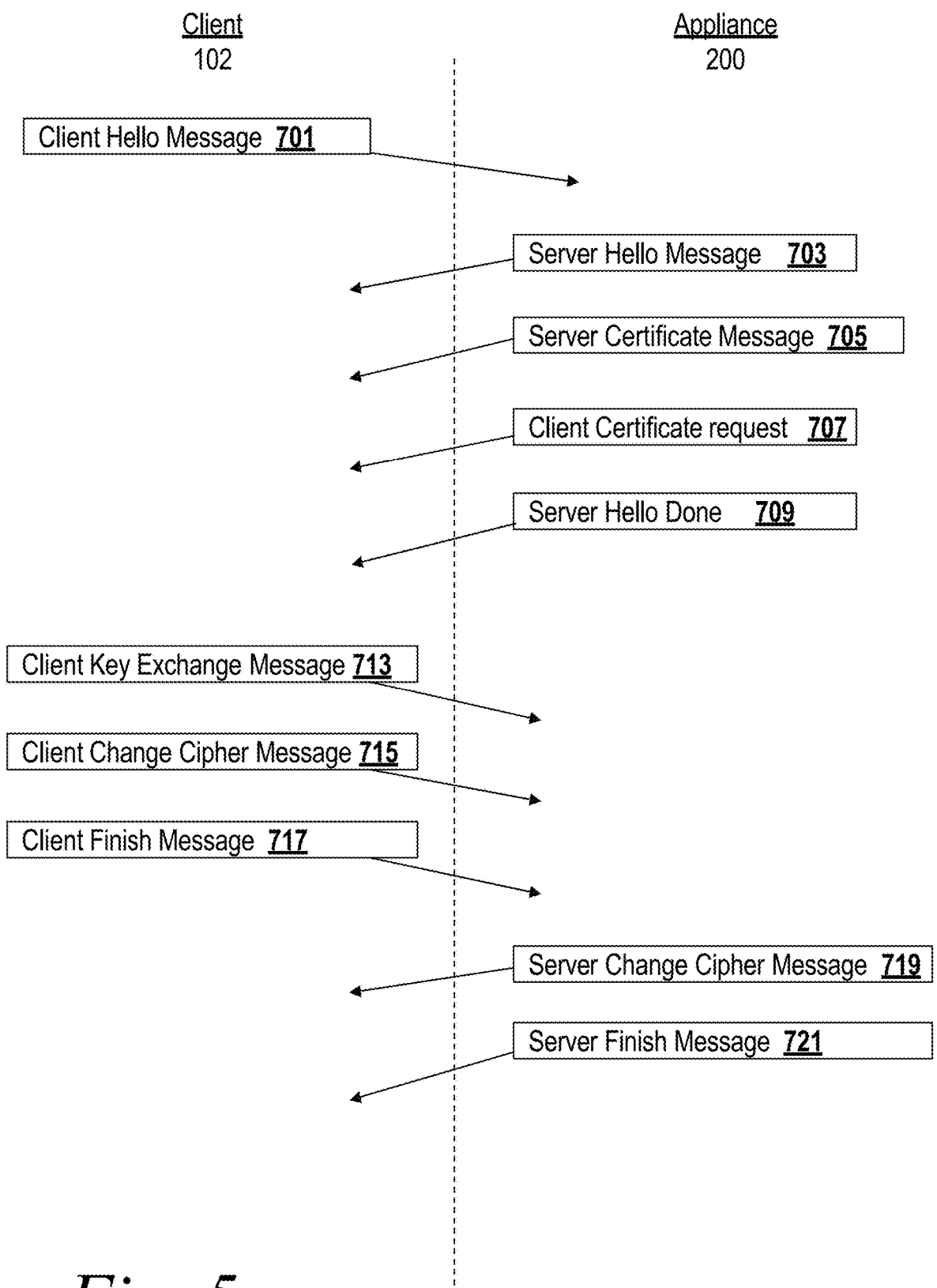
FIG. 5 is a flow diagram of an example SSL handshake.

Referring now to FIG. 5, a flow diagram of an example SSL handshake is shown. In brief overview, a client 102 transmits a client hello message 701. An appliance 200 may then respond with a server hello 703, server certificate 705, client certificate request 707, and server hello done messages 709. The client may then respond with a client key exchange message 713, a client change cipher message 715, and a client finish message 717. The appliance 200 may then respond with a server change cipher message 719, and a server finish message 421. In some SSL handshakes, in response to the server's Certificate Request message, the client may send a Client Certificate message followed by a client key exchange message 713, a client-certificate-verify message, a client-change-cipher message 715 and a client finish message 717.

Still referring to FIG. 5, now in greater detail, a client 102 and an appliance 200 engage in an SSL handshake. An SSL handshake may be performed according to any version of SSL including without limitation SSLv2 and SSLv3.0. An SSL handshake may also be performed according to any related secure communication standards including without limitation TLS 1.0 as defined in RFC 2246 and TLS 1.1 as defined in RFC 4346. Additional published documents describing related protocols and extensions to SSL and TLS which may be used in conjunction with the methods described below include without limitation RFC 2712, RFC 2817, RFC 2818, RFC 3268, RFC 3546, RFC 7132, RFC 7162, RFC 4279, RFC 4347, RFC 4366, and RFC 4492.

In one embodiments, an appliance may initiate perform an SSL handshake as a client. For example, an appliance may initiate an SSL connection with a server, or with a second appliance. In this embodiment, the appliance may send the client hello message 701, client certificate message 711, a client key exchange message 713, a client change cipher message 715, and a client finish message 717. In this embodiment, the appliance may also send a client certificate message followed by a client key exchange message 713, a client-certificate-verify message, a client-change-cipher message 715 and a client finish message 717.

In another embodiment, an abbreviated SSL handshake may be used to resume a previous session. In another embodiment, an SSL handshake may also include server verification of a client, such as via transmission from the client to the server of a client certificate and a client certificate verify message.

An SSL handshake may require a message digest be computed of all the messages exchanged in order to verify that an SSL server and SSL client have received the same messages, and no errors or attacks have been introduced into the transmissions. To perform the verification, a client may first compute a message digest of all the messages the SSL client has sent and received comprising the handshake, and then transmit the result to the SSL server via a client finish message 717. The SSL server may then compute the message digest of all messages the SSL server has sent and received in order to verify that the two message digests are the same. The SSL client and SSL server may compute the message digest usage digest algorithm agreed upon during the course of the handshake. Examples of message digest algorithms may include without limitation MD4; MD5; CRC-32; MD5; RIPEMD-160; SHA; and HAVAL.

F. Policy Driven Fine Grain Validation of a SSL Certificate of a Server for Clientless VPN Access The present disclosure is directed towards systems and methods for validating SSL certificates of servers during clientless VPN access. In the case of a clientless SSL VPN access, a SSL channel may exist between an end client and a SSL VPN proxy, and another SSL channel may be established between the SSL VPN proxy and a requested HTTPS resource. The SSL VPN proxy may be responsible for validating the server's SSL certificate and establishing its identity, on behalf of the client. The present systems and methods provide for a fine grained policy driven mechanism for validation of servers' SSL certificates during clientless VPN access of HTTPS resources through a SSL VPN Proxy or intermediary device. A traffic policy or rule can be specified and configured for use by the intermediary device, to identify or describe server(s) for which validation of respective SSL certificates is to be carried out by the intermediary device, and/or to specify CA certificate(s) with which to use to carry out the SSL certificate validation for each of the server(s). Such fine grained policy driven validation mechanism (for validation SSL certificates of servers) can provide suitable flexibility to an administrator or user of the intermediary device 801, and can enable efficient, fast and/or accurate validation of SSL certificates of servers.

Figure 6A:
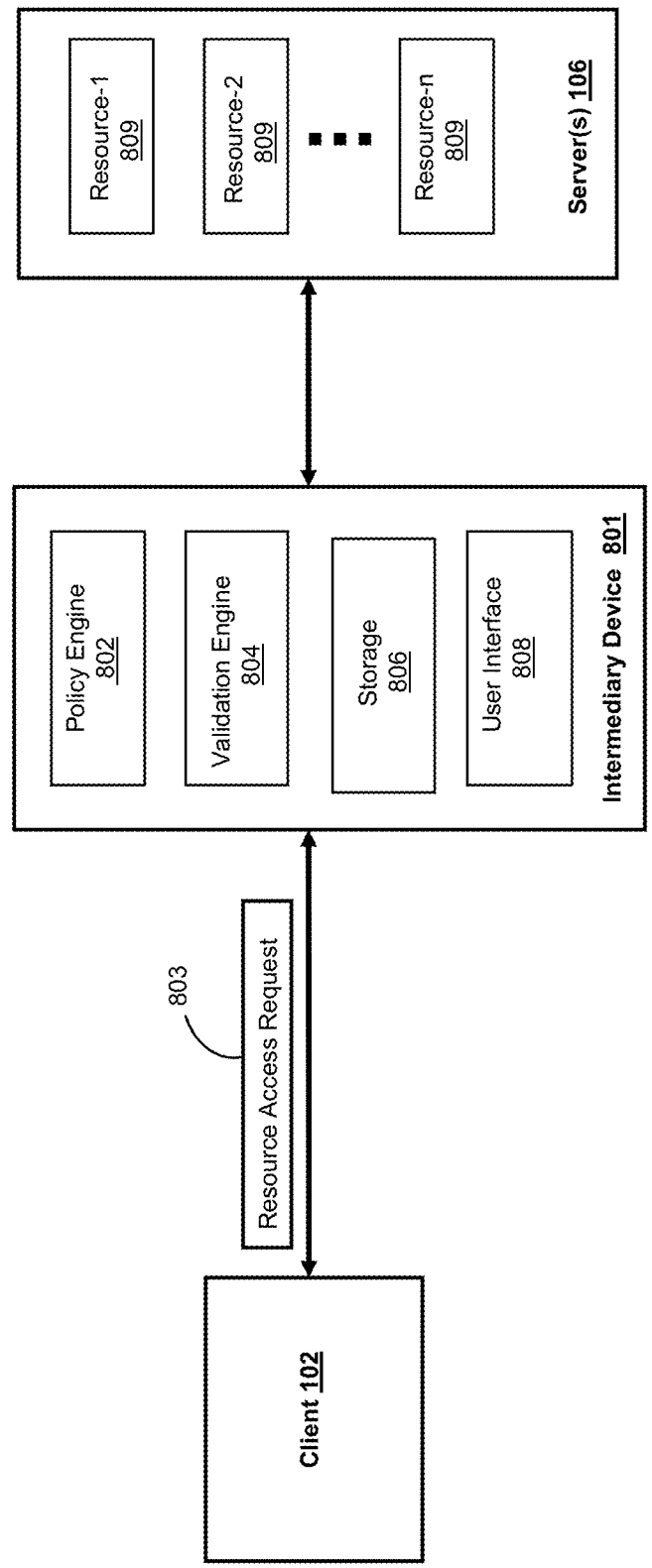
FIG. 6A is a block diagram of an embodiment of a system for validating a SSL certificate of a server for clientless VPN access.

Referring now to FIG. 6A, an embodiment of a system 810 for validating SSL certificates of servers in clientless VPN access is depicted. In brief overview, the system 810 includes a client 102, one or more servers 106 and a device 801 arranged intermediary between the client 102 and the server(s) 106. The intermediary device 801 is sometimes referred to as a SSL VPN proxy or SSL VPN gateway. In some embodiments, the intermediary device 801 includes a policy (or rule) engine 802, a validation engine 804, a storage 806 and a user interface 808. Each of the above-mentioned elements or entities is implemented in hardware, or a combination of hardware and software, in one or more embodiments. For instance, each of these elements or entities can include any application, program, library, script, task, service, process or any type and form of executable instructions executing on hardware of the device 102. The hardware includes circuitry such as one or more processors, for example, as described above in connection with at least 1E and 1F, in one or more embodiments The systems and methods of the present solution may be implemented in any type and form of device, including clients, servers and appliances 200. As referenced herein, a "server" may sometimes refer to any device in a client-server relationship, e.g., an appliance in a handshake with a client device. The present systems and methods may be implemented in any intermediary device or gateway, such as any embodiments of the appliance or devices 200 described herein. Some portion of the present systems and methods may be implemented as part of a packet processing engine and/or virtual server of an appliance, for instance. The systems and methods may be implemented in any type and form of environment, including multi-core appliances, virtualized environments and clustered environments described herein. The intermediary device 801 can, for instance, include any embodiments of one or more features of the appliance 200 described above in connection with at least FIGS. 1A-1C, 2, and 4.

The server(s) 106 may include (or may have access to) a plurality of resources 809. The client device 102 may generate a request 803 for a clientless SSL VPN connection with the server 106 to access a resource 809. The intermediary device 801 may receive, intercept or otherwise process the request 803, may validate a SSL certificate of the server 106 and/or establish a clientless VPN connection with the server 106.

The server 106 is communicatively coupled to the intermediary device 801 and may include one or a plurality of resources 809, such as web pages, text files, media files (e.g., image and/or video files), spread sheets, other data files or any combination thereof, in some embodiments. The server 106 may be configured to allow access to one or more of the resources 809 by one or more external devices (such as the client device 102). The server 106 may comprise a secure server 106 (such as a HTTPS server), and may provide access to the resources 809 over one or more secure tunnels (such as SSL VPN tunnels). Establishing a SSL VPN tunnel between the server 106 and another device (such as the intermediary device 801 or the client device 102) may involve a SSL handshake process between the server 106 and the other device. The SSL handshake process may include validating a SSL certificate of the server 106 by the other device. While some portions of this disclosure may illustratively describe a server 106 and/or a client device 102 communicatively coupled to the intermediary device 801, in general, the system 810 can include a plurality of servers 106 and/or a plurality of client devices 102 communicatively coupled to the intermediary device 801.

In order to access a resource 809 of a server 106, the client 102 may generate and send a request for such a resource. In hypertext transfer protocol secure (HTTPS) resource access over a VPN tunnel, a SSL handshake may take place (e.g., directly) between the client 102 and the server 106 (e.g., a HTTPS server), and the client 102 may send one or more resource access requests to the server 106 over the VPN tunnel. The client 102 can include a client agent or client VPN agent that can direct or send the one or more resource access requests to the intermediary device 801. However, the intermediary device 801 may not play a significant role in terms of validating the SSL certificate of the server and/or establishing the server's identity for instance. In HTTPS resource access over a VPN tunnel, the client 102 (or the respective user who is accessing the HTTPS resource) may be primarily responsible for verifying the identity of the server and/or making sure that the client 102 is connecting to the "right" (e.g., verified and/or validated) server that possesses a valid certificate.

In clientless VPN access, there are two SSL channels or connections in some embodiments; one channel between the client and the intermediary device 801, and another channel between the intermediary device 801 and the server 106. The server 106 may perform the SSL handshake with the intermediary device 801. In some embodiments, the server 106 may present its SSL certificate to the intermediary device 801, and the client 102 may have no access to the SSL certificate of the server 106. The intermediary device 801 may take the responsibility of validating the SSL certificate and/or verifying the identity of the server 106. By performing validation of the SSL certificate of the server, the intermediary device 106 can prevent the client 102 from connecting to a rogue server, thereby protecting personal and/or critical information (such as user credentials, confidential data or the like) associated with the user of the client from being compromised.

In many enterprise solutions (or systems), intermediary devices 801 may be employed to manage (or control) access to resources on enterprise servers by mobile device management (MDM) controlled mobile devices or other remote devices. In some embodiments, resource access (e.g., including access to external or public resources) through a MDM controlled mobile device is routed through and/or controlled by an intermediary device 801 (or a SSL VPN proxy). For example and in some embodiments, in some Citrix-XenMobile-Enterprise deployments, a resource access through a WorxWeb client running on a mobile device may be directed through a SSL VPN proxy using a clientless access mode (or a secure browse mode). Some users may use the WorxWeb client to access certain public resources like the users' bank websites. In such a scenario, if the SSL VPN proxy fails to thoroughly validate the identity of a corresponding server for such resources through the server's SSL certificate, the end user may end-up connecting to a rogue server masquerading as a server of the user's bank for instance, and the end user's data (such as the bank credentials of the user) can be compromised. Such scenarios can represent a security threat. In some embodiments, aspects of the present systems and methods can provide for the validation of a SSL certificate of a resource server, for expiry and signature for instance, and/or establishing the server's identity by verifying the server's Common-Name (CN) indicated in the SSL certificate. Validation of the SSL certificate of a server can include checking the SSL certificate for signature and/or expiry, and/or validating the Common-Name and/or Domain-Name fields. Validating the Common-Name and/or Domain-Name fields can prevent a server possessing an otherwise valid certificate but belonging, for example, to 'rouge.com' domain from misrepresenting itself as corresponding to another domain, 'bank.com' for instance.

Referring again to FIG. 6A, a user of a client 102 can log on to the intermediary device 801 according to or using a clientless VPN mode (or clientless SSL VPN mode). In such a mode, the client 102 may not employ (or may not include or have access to) a VPN client to direct resource access requests originating at the client 102 to a corresponding server for accessing a resource. Upon successfully logging on to the intermediary device 801, the client can use a home page (or landing page) to generate resource access requests and send such requests to the intermediary device 801. The intermediary device 801 may provide the home page, or may direct the client to the home page, for instance. By way of illustration, a home page is described herein but not intended to be limiting in any way. For instance, an application or other interface may be provided, by the intermediary device 801 or otherwise, in place of the home page which may be a web page or hyperlinked document.

The home page (or landing page) can include links of various enterprise (corporate) and/or external (public) resources. Each link can correspond to a respective resource 809 of a server 106. Each link may be represented or implemented by a hyperlink, an icon, a widget and/or any associated text, image, video or other multimedia element. Each link may be designed and/or configured for clientless VPN access such that upon actuation of the link, a respective resource access request may be directed or sent to the intermediary device 801, for example even though there may be no VPN client present to tunnel or direct the request to the intermediary device 801. The resource access request generated when actuating the link can include an address or uniform resource locator (URL) string of the link in the request. As an illustrative example, and in some embodiments, the following URL or address string can be included or made available on the homepage (or landing page):

https://gateway.citrix.com/cvpn/https/resource.citrite.net/file1.txt

The link above can be viewed as including three concatenated components. A first component "https://gateway.citrix.com" may represent an address of the intermediary device 801. A second component "/cvpn/" may represent a prefix that can be interpreted (or understood) by the intermediary device 801 to be preceding an address of a resource 809 of the server 106. A third component "https://resource.citrite.net/file1.txt" may represent an address of a resource 809 of the server 106. The address of the resource 809 may include an address "https://resource.citrite.net" of the respective server 106, for instance.

The intermediary device 801 may be intermediary between the client device 102 and the server 106. More generally, the intermediary device 801 can be communicatively arranged between a plurality of clients and a plurality of resource servers. The intermediary device 801 may be configured to receive a resource access request 803 from the client 102, and may request for and validate or verify a SSL certificate of the server associated with the requested resource 809 before connecting the client 102 to the server 106. For instance, upon receiving a resource access request from the client 102, the intermediary device 801 can extract or parse the link associated with the resource access request, and may identify a server associated with the requested resource. In some embodiments, the intermediary device 801 can extract an address, domain name or URL of the server 106 from the link. The intermediary device 801 can then start or initiate an SSL handshake with the server 106 to obtain and validate the SSL certificate of the server 106. The intermediary device 801 can employ certificate authority (CA) certificates (e.g., verisign) to validate SSL certificates of servers. Specifically, the intermediary device 801 can access, store and/or maintain one or more CA certificates against which SSL certificates provided by servers (such as server 106) can be validated.

In designing or configuring a validation mechanism to be employed by the intermediary device 801 for validating SSL certificate of resource servers (such as server 106), various aspects may be considered including computational efficiency, flexibility and validation accuracy of the validation mechanism. For instance, validation of the SSL certificate of the server 106 can be achieved by validating (or comparing) the SSL certificate of the server 106 against all or some CA certificates maintained at the intermediary device 106 until one of the CA certificates results in a successful validation or all CA certificates fail. Such a validation approach may be computationally exhaustive, inefficient and/or non-flexible. The validation of the SSL certificate of the server against each CA certificate maintained at the intermediary device 801 may consume and waste the resources of the intermediary device 801 by performing redundant and unsuccessful checks, thereby unnecessarily extending the overall validation process. Also, by using such a validation approach, a system administrator may not have the flexibility to specify which CA certificates to use to validate the SSL certificate of a server based on, for instance, a domain (e.g., "bank.com") associated with the requested resource, and/or what actions should be taken by the intermediary device 801 if the SSL certificate of the server 106 cannot be validated against any of the installed CA certificates. In certain situations, a system administrator may want to control or manage SSL certificate validation by restricting SSL certificate validation to only servers associated with certain domains such as "bank.com", "itsupport.com", "myhr.com" and "sap.com". For example and in some embodiments, a rule or policy may specify that certificate validation is not to be applied on certain domains (or domain not specified or listed for certificate validation), or if applied, the result would not prevent establishing a VPN connection between the client 102 and the server 106. Such a control (or restriction) may be a reasonable and/or practical feature for system administrators given that deploying a CA certificate at the intermediary device 801 for every possible server or domain that users may want to access may not be practically possible, and may be tedious and/or time consuming. Without such a control feature, the intermediary device 801 may end up preventing users from accessing all resources for which a corresponding CA certificate is not installed or available, thereby imposing unnecessary inconvenience and/or frustration on users which may impact productivity.

As provided in the current disclosure, and in some embodiments, the intermediary device 801 may configured to provide fine grained control to users such as system administrators, and can allow for a policy driven validation of SSL certificates of servers during or using clientless VPN access. In particular, the intermediary device 801 may implement a packet traffic policy for controlling or managing requests for clientless VPN access of HTTPS resources. The packet traffic policy or rule may specify, identify or define (1) server(s) for which validation of respective SSL certificates is to be carried out by the intermediary device, and/or (2) CA certificate(s) with which to use to carry out the SSL certificate validation for each of the server(s). Such fine grained policy driven validation mechanism (for validation SSL certificates of servers) can provide suitable flexibility to an administrator or user of the intermediary device 801, and can enable efficient, fast and/or accurate validation of SSL certificates of servers. For instance, for Citrix Netscaler Gateway by way of a non-limiting example, employing such fine grained policy driven validation of SSL certificates may provide a significant differentiator over other existing VPN gateways in performance, efficiency, flexibility and/or otherwise.

In certain embodiments, the intermediary device 801 includes a policy or rule engine 802 configured to execute rules or policies defining when and how SSL certificate validations may be applied. A rule (e.g., a packet traffic policy) can define a condition that, if evaluated to TRUE in response to a resource access request 803, can trigger or initiate a respective process of SSL certificate validation for the server associated with the requested resource 809. The rule may specify a particular action, such as one or more specific CA certificates to be applied if the condition is evaluated to TRUE. For instance, the rule can be used to identify or match to a specific domain (or a set of domains or servers) for which the SSL validation is to be applied, and may specify one or more corresponding CA certificates to be used for the specified domain (or set of domains or servers). For instance, responsive to receiving the resource access request 803, the intermediary device 801 can determine a domain (or set of domains or servers) associated with the requested resource 809, and may determine if the domain is identified by or matches to the rule.

For example, the intermediary device 801 can extract or determine a domain name (or server address) from a link identified or included in the resource access request 809. The policy engine 802 can then use the extracted domain name (or server address) to evaluate a condition associated with a given rule. The policy engine 802 may evaluate if a condition in the rule is met, for example, by checking whether the extracted domain name (or server address) conforms with a description of one or more domain names or server addresses specified in the rule for the condition. In some cases or embodiments, the description of the one or more domain names or server addresses may not be an explicit identification or listing of the actual domain names or addresses. For instance, the description may comprise a search string or regular expression for matching to a domain name or address of a server or resource, or specify category or group of servers or resources (e.g., a group comprising all servers or domains).

In some embodiments, the policy engine determines if a condition of the rule evaluates to TRUE. For example, the policy engine may determine that a domain name of a server having or hosting the request resource matches or falls into the description in the rule. Responsive to the condition of the rule being evaluated to TRUE, the policy engine 802 may determine that a CA certificate specified by the rule is to be used to evaluate a SSL certificate of the server 106. The policy engine 802 can manage, maintain and/or have access to a plurality of rules, in which case, the policy engine 802 may evaluate the conditions of various rules until one of the conditions is satisfied. In some embodiments, the policy engine 802 evaluates the conditions of a plurality of rules to identify some or all conditions of the rules that are satisfied based on the request. The policy engine 802 may determine the respective CA certificate(s) specified in each rule corresponding to each satisfied condition, to be used in validating a SSL certificate of a corresponding server 106.

The intermediary device 801 may include a validation engine 804 configured to perform, facilitate or implement validation of a server's SSL certificate. The validation engine 804 can be configured to examine a SSL certificate for signature and/or expiration. For instance, the validation engine 804 may check or determine if a signature (e.g., digital signature) of the SSL certificate, or the SSL certificate has expired or is still valid. The validation engine 804 may check or determine if the signature of the SSL certificate is by an untrusted or unknown certificate authority, or is inconsistent with or fails to match with CA certificate(s) specified in a corresponding rule. The validation engine 804 can also be configured to cross verify a common-name and/or domain-name (which may comprise a host name or root name) associated with a SSL certificate (e.g., provided by server 106), against a fully qualified domain name (FQDN) associated with a resource access request 803 (e.g., received from the client 102). In some embodiments, upon the policy engine 802 determining that a validation action specific is to be applied (based on a satisfied condition of a given rule), the policy engine 802 can instruct or request the validation engine 804 to perform the determined validation action. In response to the request or instruction, the validation engine 804 can perform the validation action to determine whether access to a requested resource 809 is to be allowed or blocked (e.g., denied or ignored). In certain embodiments, performing the validation action can include validating the SSL certificate of the server 106 against one or more CA certificate specified in or with the validation action. In some embodiments, the validation engine 804 can be a component of the policy engine 802.

In some embodiments, the intermediary device 801 includes a memory storage 806. The memory storage 806 can store or maintain CA certificates, validation actions, validation rules (or policies, each of which may include one or more corresponding validation action(s) in some embodiments), other data or any combination thereof. The CA certificates, the validation actions and/or the validation policies can be stored in the storage memory according to one or more data structures such as tables, linked lists, trees, nested data structures or other data structures. Certain information in the storage memory 806 may be accessible to the policy engine 802 and/or the validation engine 804.

In some embodiments, a user interface 808 allows an administrator or user of the intermediary device 801 to manage and/or configure (such as add, delete or modify) rules and/or corresponding actions. The user interface 808 may comprise a command line and/or input script interface, a graphical interface, a web or application interface, and/or any other type of interface. The user interface 808 can allow the administrator to manage or organize (such as add or delete) CA certificates maintained at the intermediary device 801. The administrator can use any tabs, icons or features associated with the user interface 808 to manage the rules and/or respective actions. The user interface 808 can display one or more CA certificates and/or lists of CA certificates maintained at the intermediary device 801, for example allowing the administrator to select from when managing rules and respective actions. The user interface 808 can display, and allow selection from, any existing rules and/or rules that can be imported or accessed remotely. In some implementations, the user interface 808 can provide a set of commands and/or command options for use in managing validation rules and/or respective actions. For example, the following are illustrative embodiments of commands that when entered by the administrator via the user interface 808, can define or specify an action action_1 and a respective rule (or policy) policy_1:

```
> add vpn traffic action action_1 -CAcertificates ca1
> add vpn traffic policy policy_1 -rule
  "HTTP.REQ.URL.CONTAINS(myhr.com)" -action action_1
```

A rule such as the above, and the corresponding action, may sometimes be collectively referred to merely as a rule or (packet traffic) policy, since the rule (e.g., policy_1) incorporates or uses the corresponding action (e.g., action_1). The above traffic policy (or rule) policy_1 may specify that if the client 102 requests access to a resource 809 in the 'myhr.com' domain, then the CA certificate 'ca1' is to be used to validate the SSL certificate of the server 106. For instance, 'ca1' is the name of a CA certificate file available to or pre-installed at the intermediary device 801.

Another example of adding a validation rule (or traffic policy) and a respective action can be formulated, in some embodiments, as:

```
> add vpn traffic action action_2 -CAcertificates ca2
> add vpn traffic policy policy_2 -rule
  "HTTP.REQ.URL.CONTAINS(mybank.com)" -action action_2
```

In the above example, action_2 may refer to the use of 'ca2', and the traffic policy policy_2 may specify that if the client 102 requests access to a resource 809 in the 'mybank.com' domain, then the CA certificate 'ca2' is to be used to validate the SSL certificate of the server 106. For example, 'ca2' is the name of a CA certificate file available to or pre-installed at the intermediary device 801.

The traffic policies policy_1 and policy_2 described above can provide an illustration of how the fine grained policy driven validation mechanism allows an administrator of the intermediary device 801 to configure the SSL certificate validation process to be applied based on information (such as domain name or server address) in the resource access request 803. When applied by the policy engine 802, the traffic policies policy_1 and policy_2 can cause the intermediary device 801 to use 'ca1' for the validation of server SSL certificates in response to resource access requests 803 requesting resources associated with the domain "myhr.com,' and use the CA certificate 'ca2' when validating server SSL certificates in response to resource access requests 803 requesting resources associated with the domain "mybank.com.' Therefore, the intermediary device 801 performs customized operations according to the fine grained configuration specified by the traffic policies policy_1 and policy_2. If a resource access request 803 indicates a request to access a resource 809 associated with, for example, an unrecognized or unspecified domain, e.g., 'mysap.com,' the intermediary device 801 may not initiate a server SSL certificate validation process for such a request, for example since that the conditions specified in policy_1 and policy_2 are not satisfied for the domain name 'mysap.com.' This configuration can offer a finer control relative to the general approach where an intermediary device automatically tries to validate a server SSL certificate against any and all CA certificates available at the intermediary device (in some order), until at least one of the CA certificates successfully validates the server SSL certificate, or until all of the CA certificates fail to validate the server SSL certificate.

In another non-limiting example, the administrator can configure the intermediary device 801 to validate the SSL certificate for all servers or domain names using specific CA certificates (e.g., 'ca1' and 'ca2') by defining and adding the traffic policy policy_3 and the respective action action_3 described below in one embodiment:

```
> add vpn traffic action action_3 -CAcertificates ca1, ca2
> add vpn traffic policy policy_3 -rule NS_TRUE -action action_3
```

In the above traffic policy configuration (policy_3), the condition or description of 'NS_TRUE' may be configured to always evaluate to TRUE. The respective action 'action_3' may include a list (e.g., a comma-separated list) or subset of pre-installed or available CA certificates ('ca1' and 'ca2') indicating that these specific CA certificates are to be employed when validating server SSL certificates. With the above configuration, in response to a requested access of 'any' SSL/HTTPS resource through the intermediary device 801, the validation engine 804 can proceed to validate corresponding server SSL certificates against the specified CA certificates, ca1 and ca2 (in some order). If any of ca1 or ca2 is able to successfully validate the server SSL certificate, the intermediary device 801 can allow the resource access to the requested resource, and can block access if otherwise.

The fine grained policy driven SSL certificate validation mechanism described herein can accommodate various implementation and/or deployment options and features. For instance, the fine grain policy driven SSL certificate validation mechanism can allow for specifying which exact CA certificate(s) is/are be used to validate each SSL certificate presented by each respective server. It can allow for specifying all or a subset of domains for which server SSL certificate(s) are to be validated.

Figure 6B:
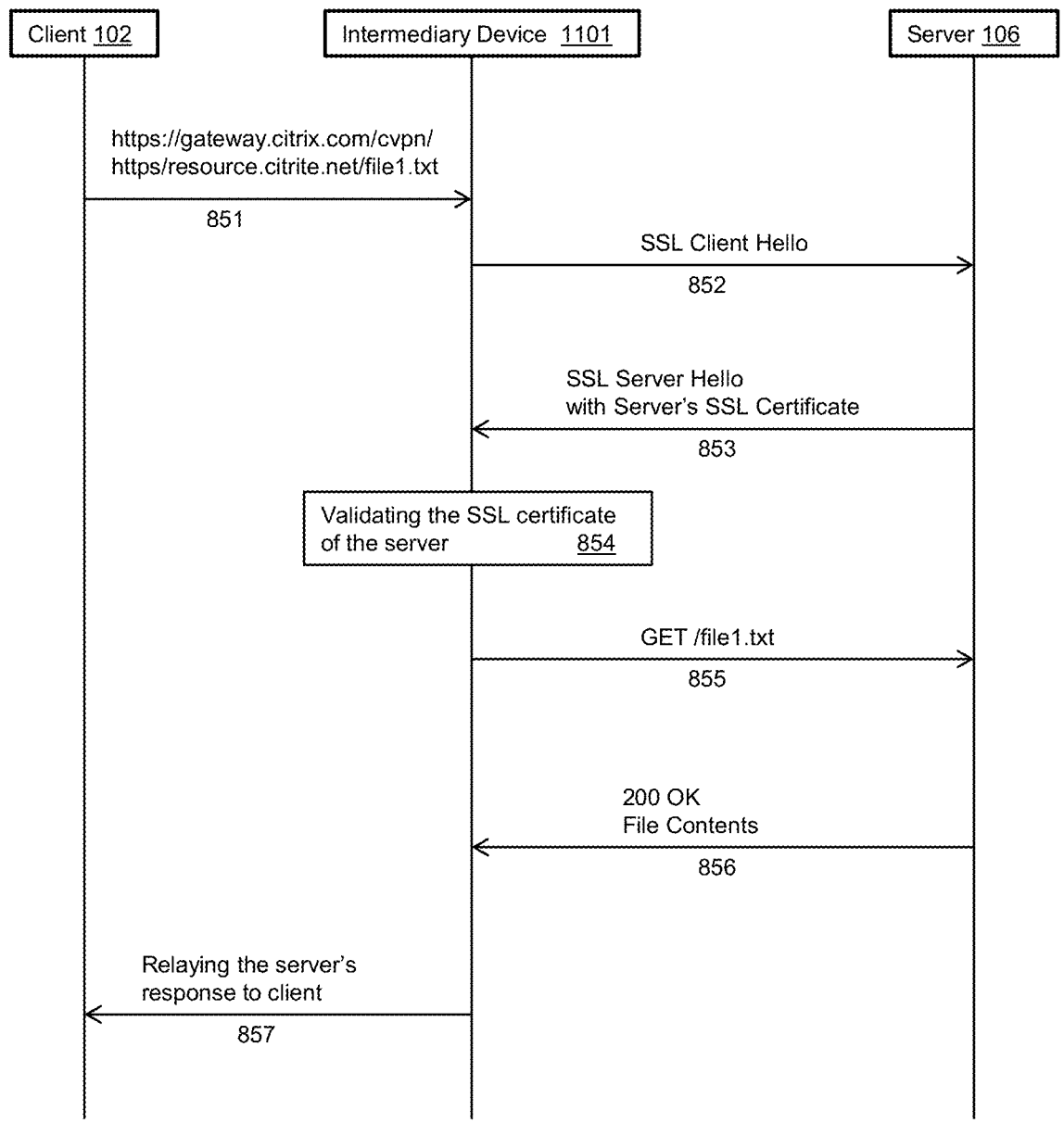
FIG. 6B is a flow chart an example signaling sequence for establishing clientless VPN access to a server.

Referring now to FIG. 6B, illustrated is an example representation of a signaling sequence 850 between entities for establishing clientless VPN access to a server resource. In brief overview, the signaling sequence 850 may include a client 102 sending a resource access request to the intermediary device 801 (step 851), the intermediary device 801 initiating a handshake process with the server 106 (step 852) and the server 106 participating in the handshake and sending a SSL certificate to the intermediary device 801 (step 853). The signaling sequence 850 may include the intermediary device 801 validating the SSL certificate of the server 106 (step 854) and the intermediary device 801 forwarding or conveying the resource access request to the server 106 upon successful validation of the SSL certificate of the sever 106 (step 855), The signaling sequence 850 may include the intermediary device 801 receiving the requested resource (or a copy thereof) from the server 106 (step 856) and forwarding the resource to the client 102 (step 857).

Referring to step 851, and in some embodiments, include a client 102 sends a resource access request to the intermediary device 801. When a URL or link available on a homepage (or landing page) associated with the client 102 is actuated (e.g., a user clicks on or selects the URL or link), a HTTP request is sent by the client 102 (e.g., via a browser presenting the homepage) to the intermediary device 801. An example HTTP request generated and sent responsive to actuation of the link or URL can be represented as:

```
GET /cvpn/https/resource.citrite.net/file1.txt
Host: gateway.citrix.com
Cookie: <User's Session Cookie for SSLVPN Gateway>
``` where "Host" may refer to a domain name or address of the intermediary device, and the "GET" statement references a location of the requested resource.

Referring to step 852, and in some embodiments, upon receiving the resource access request, the intermediary device 801 can establish a transport control protocol (TCP) connection and may initiate a SSL handshake with the server 106. The intermediary 801 device can extract an address of the server 106 (such as the address 'resource.citrite.net') from the resource access request and use the extracted address to establish the TCP connection and initiate the SSL handshake process. The intermediary device 801 can initiate the SSL handshake process with the server 106 by a 'SSL Client Hello' message (or request) to the server 106 over the TCP connection. In response to the 'SSL Client Hello' message, the server 106 can proceed with the SSL-handshake by sending or replying with a 'Server Hello' message and presenting its SSL Certificate (step 853).

Upon receiving the SSL certificate of the server 106, the intermediary device 801 (or the policy engine 802) can check if any validation rule (or traffic policy) condition evaluates to TRUE for the received resource access request. For instance, the intermediary device 801 can check whether the server address (or a domain name associated thereof) conforms or matches with a domain name (or set of domain names of servers) specified or covered in a condition of one of the validation rules (or traffic policies) maintained at the intermediary device 801.

Referring to step 854, and in some embodiments, if a condition of one of the validation rules (or traffic policies) evaluates to TRUE, the intermediary device 801 (or the validation engine 804) can perform validation on the SSL certificate of the server 106. The intermediary device 801 can validate the SSL certificate of the server 106 according to an action (e.g., validation using a specific CA certificate) specified in the validation rule. For instance, the intermediary device 801 can validate the server SSL certificate against a specific CA-certificate associated with the validation rule (or traffic policy) via a corresponding validation action for instance.

Referring to step 855, and in some embodiments, if validation of the server SSL certificate is successful, the intermediary device 801 can forward the resource access request (such as the HTTP request described above), or an indication thereof, to the server 106. For instance and in some embodiments, the intermediary device 801 can send the following illustrative representation of a HTTP request to the server 106 upon successful validation of the SSL certificate of the server 106:

```
GET /file1.txt
Host: resource.citrite.net
```

Successful validation of the SSL certificate of the server 106 may include checking and confirming that a common name and/or domain name specified in the SSL certificate matches with the FQDN (such as 'resource.citrite.net') of the host server 106 associated with the resource access request. If the validation of SSL certificate fails, the intermediary device 801 can drop or deny the connection to the server 106 and send a message to the client 102 indicating that the server 106 has failed to prove its identity for instance.

Referring to step 856, and in some embodiments, the server 106 can respond to the request of the intermediary device 106 by sending the requested resource or copy of the requested resource. The intermediary device 801 can then forward the requested resource (or the copy thereof) to the client 102 (step 857).

Figure 6C:
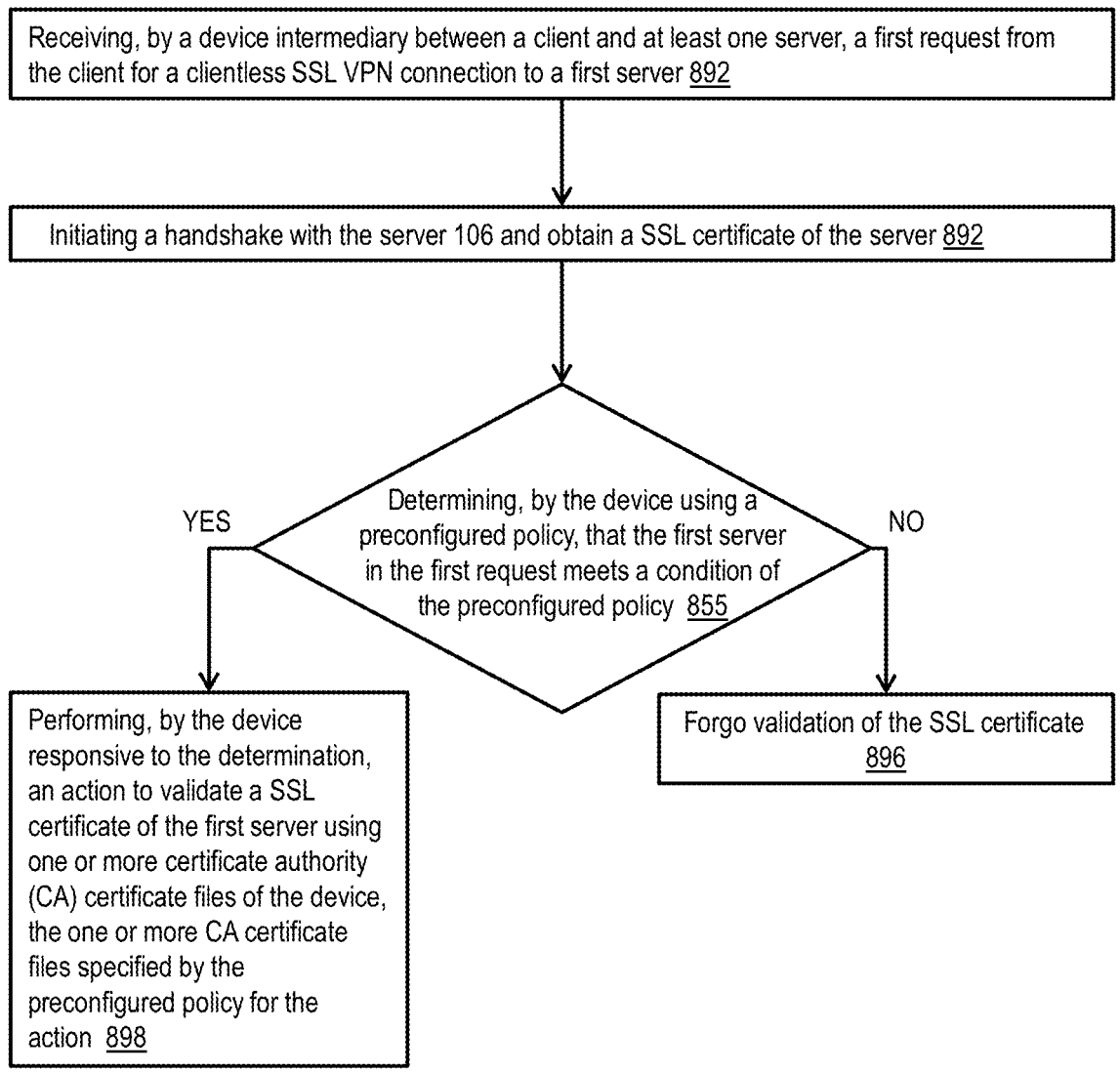
FIG. 6C is a flow diagram of an embodiment of a method for validating a SSL certificate of a server for clientless VPN access by an intermediary device.

Referring now to FIG. 6C, illustrated is one embodiment of a method 890 for validation of a secure socket layer (SSL) certificate of a server for clientless SSL virtual private network (VPN) access. In brief summary, an intermediary device 801 can receive a first request from a client (102) for a clientless SSL VPN connection to a server 106 (step 892). Responsive to the first request, the intermediary device 801 can initiate a handshake with the server 106 and obtain a SSL certificate of the server 106 (step 894). The intermediary device 801 can determine, using a preconfigured policy, whether the server 106 indicated in the first request meets a condition of the preconfigured policy (step 895). If the server 106 meets the condition of the preconfigured policy, the intermediary device 801 can perform an action to validate the SSL certificate of the server 106 using one or more CA certificate files maintained at the intermediary device 801 and specified by the preconfigured policy (step 898). Otherwise, the intermediary device 801 may send a second request to the server 106 without validating the SSL certificate of the server 106 (step 896).

Referring to step 892, and in some embodiments, an intermediary device 801 may receive a first request from a client 102 for a clientless SSL VPN connection to a server 106. The intermediary device 801 may receive the first request from the client via an activated link, e.g., in a home page or landing page. The first request may be a request to access a resource of the server 106. In some implementations, the first request can comprise a HTTP GET request. The request may include an address of the server 106 and/or an indication, location or identifier of the requested resource.

In some embodiments, a uniform resource locator (URL) may be provided, via the intermediary device, to the client for initiating the request for the clientless SSL VPN connection, the URL including an indication of the first server 106. For instance, the client 102 may log on to the intermediary device, to a virtual private network of an enterprise for example. Responsive to the log on, the intermediary device may provide the client 102 with, or direct the client 102 to a page or interface for accessing various resources. The page or interface may comprise a landing page or home page for example. The intermediary device 801 and/or a second server (e.g., an enterprise server or resource directory server) can provide the page or interface to the client 102, which may include or provide a link or uniform resource locator (URL) string to the client 102 for initiating the first request for the clientless SSL VPN connection. The URL string can include an indication or address of the server 106, and/or an indication or address of the intermediary device 801. For instance, the intermediary device 801 can provide the client 102 with, or direct the client 102 to, a landing page or homepage having a link corresponding to the URL string. The second server and/or the intermediary device 801 may host or provide the landing page or homepage. The landing page can include one or more links for one or more respective server resources.

Each of these links may include or correspond to a unique URL string that references a corresponding resource available to the client 102. In some embodiments, the URL string comprises information (e.g., about the corresponding resource and/or intermediary device) for triggering a clientless SSL VPN access to the resource. A user may actuate a corresponding link, which triggers instructions to generate a request for the clientless SSL VPN access to the resource. By actuating the link on the landing page, the client 102 may generate, via a browser for instance, a resource access request destined to the intermediary device 801 and indicative of the server 106 and the respective resource of the server 106. The resource access request may include information about a domain name or address of the intermediary device, and a location or an associated domain name for the requested resource. The resource access request may be routed or directed to the intermediary device in accordance with the domain name or address of the intermediary device.

Referring to step 894, and in some embodiments, the intermediary device 801 may initiate a handshake with the server 106, responsive to the first request, and may request for and/or obtain a SSL certificate of the server 106. The intermediary device 801 parse the first request and may extract and indication or address of the host server 106 of the resource. The intermediary device 801 may use the indication or address of the server 106 in the first request to establish a connection (such as a TCP connection) with the server 106, and may initiate a SSL handshake process with the server 106. The intermediary device 801 may initiate the SSL handshake process by sending a 'SSL Client Hello' message (or request) to the server 106 over the established connection. In response to the 'SSL Client Hello' message, and as part of the SSL handshake process, the server 106 can respond by sending a 'Server Hello' message. The server 106 may send or provide its SSL certificate to the intermediary device 801, e.g., in response to the 'SSL Client Hello' message, and/or as part of the SSL handshake process.

Referring to decision block 895, and in some embodiments, the intermediary device 801 may determine, using a preconfigured policy, whether the server 106 indicated in the first request meets a condition of the preconfigured policy. In some embodiments, the intermediary device 801 may check if any preconfigured policy (among a plurality of preconfigured policies maintained at or accessible by the intermediary device 801 for instance) matches information (such as address, domain name or other information) associated with the server 106. For instance, the intermediary device 801 may check whether an address or domain name of the server 106 falls within a condition of one of the preconfigured policies (or validation rules or traffic policies) of the intermediary device 801. For example, a policy engine of the intermediary device 801 may check and confirm if a condition of the preconfigured policy specifies, covers or matches with the address or domain name of the server 106. If the policy engine and/or the preconfigured policy determine that the condition is met or matches with the server 106, the policy engine and/or the preconfigured policy may be configured to trigger an action to validate an SSL certificate of the server 106.

In some embodiments, the intermediary device 801 provides a user interface for preconfiguring the policy, e.g., preconfiguring the action for the policy and preconfiguring a rule with the condition for triggering the action. The user interface may allow preconfiguring of the policy via selectable tabs, icons, graphical elements, configuration commands or a combination thereof. A user of the intermediary device 801 can configure one or more policies and/or import one or more policies via the user interface. In some embodiments, the preconfigured rule may be configured to trigger the action for one or more specified servers which may include the first server 106. The preconfigured policy may identify or list (e.g., via the respective action) one or more CA certificate files which comprise a subset of a plurality of CA certificate files available to the device, to use in SSL certificate validation Referring to step 898, and in some embodiments, the intermediary device 801, responsive to determining that the server 106 meets the condition of the preconfigured policy, the intermediary device 801 may perform an action to validate the SSL certificate of the server 106 using one or more CA certificate files maintained at the intermediary device 801 and specified by the preconfigured policy. In some embodiments, the preconfigured policy can identify, specify or list one or more CA certificate files to be used in validating the SSL certificate of the server 106. The one or more specified CA certificate files can represent a subset of a plurality of CA certificate files available to the intermediary device 801. In some implementations, performing the action to validate the SSL certificate may include examining the SSL certificate for signature and/or expiry, using the one or more specified CA certificate files. In some embodiments, performing the action to validate the SSL certificate may include matching a fully qualified domain name of the server 106 (e.g., in the one or more CA certificate files) with at least one of a common name or a domain name included in the SSL certificate of the server 106. In some embodiments, by validating the SSL certificate of the server 106 using the one or more specified CA certificate files (which represent a subset of a plurality of CA certificate files available to the intermediary device 801), the intermediary device can reduces time and/or resources consumed for processing the first request. In other words, by validating against a subset of the CA certificates, instead of all the CA certificates available to the intermediary device 801, the intermediary device 801 can process the first request in a more targeted and/or efficient manner.

If the validation of the SSL certificate of the server 106 fails, the intermediary device may deny or drop the requested clientless SSL VPN connection, and/or may send a message to the client 102 indicating the failure. However, if the validation of the SSL certificate of the server 106 is determined to be successful by the intermediary device 801, the intermediary device 801 can generate and/or send a second request to the server 106. The second request can include the first request, an indication of the first request or a modified version of the first request. For instance, the second request may include a GET HTTP or GET HTTPs request indicative of a requested resource and/or an indication (such as an address or domain name) of the server 106. Responsive to the second request, the intermediary device can facilitate or provide access to the requested resource. For instance, the intermediary device can receive a requested resource or a copy thereof from the host server 106, and can forward or transmit the received resource copy to the client 102.

Referring to step 896, and in some embodiments, the intermediary device 801, responsive to determining that the server 106 does not meet the condition of the preconfigured policy at decision block 895, may determine to forego validation of the SSL certificate. The intermediary device 801 may, in some embodiments, send a second request to the server 106 without validating the SSL certificate of the server 106. For instance, the intermediary device 801 may establish a connection with the server 106 without SSL features. The second request can include the first request, an indication of the first request or a modified version of the first request. For instance, the second request can include a GET HTTP request indicative of the requested resource and an indication (such as an address or domain name) of the server 106. Responsive to the second request, the intermediary device 801 may facilitate or provide access to the requested resource without using a SSL VPN connection to the server 106. In some embodiments, responsive to determining that the server 106 does not meet the condition of the preconfigured policy at decision block 895 and/or that a SSL certificate of the server 106 cannot be validated, the intermediary device 801 may deny, terminate or drop the connection with the server 106 and/or send an error message to the client 102.

In some embodiments, the intermediary device 802 may receive a third request for a clientless SSL VPN connection to another server. In response, the intermediary device may determine that the other server in the third request fails to match a condition in any preconfigured policy for clientless SSL VPN connection. The intermediary device 802 may determine to forego validation of a SSL certificate of the other server, for example as described above in connection with step 896.

G. Systems and Methods for Establishing at Least One Secure Connection for a Session The present disclosure is directed towards systems and methods for establishing at least one secure connection for a session. With a proxy or intermediary deployed between a client making a request and a server hosting the requested resource, there may be two SSL sessions that are established: one between the device and the proxy and another between the proxy and the server. Establishing each SSL session may introduce latency in creating connections among the client, the proxy, and the server, due to the corresponding handshaking processes for establishing the SSL sessions. The handshake between the client and the proxy and between the proxy and the server may each consume up to 20-200 milliseconds. Establishing the two SSL sessions in sequence (between the client and the proxy and then between the proxy and the server) may thus take up to 40-400 milliseconds or even more.

To alleviate or reduce the latency arising from establishing multiple SSL sessions, the present systems and methods provide for optimization of SSL session establishment at such similar deployed proxies by utilizing session re-use technique based on session identifiers or session tickets. The present systems and methods may also leverage on pre-established connections between the proxy and the server and/or Domain Name System (DNS) messages. The proxy may for instance intercept a DNS request sent from a client regarding a particular server, e.g., so as to access a resource at the server. The proxy may include or operate as a DNS server and/or an intermediary device deployed between the client and the server. Prior to receiving a request for a SSL connection between the client and the server, the proxy may intercept and/or parse the DNS request. Based on the parsed DNS request, the proxy may determine or predict that the client is to establish a session with the server. Accordingly, the proxy may initiate establishment of a SSL session in advance of receiving a SSL connection request.

The proxy may determine that the DNS request is referencing the server and may determine or predict that the session to be established with the server is an SSL connection. Based on the determination(s) and/or prediction, the proxy may identify a secure connection to be established between the proxy and the server, by using a cached or stored session identifier or a session ticket for example. In some embodiments, the session identifier or a session ticket are identified and/or generated according to a prior SSL session established by the proxy. The identification of the secure/SSL connection with the session identifier or the session ticket may be performed concurrently or prior to the client sending a first hello message for establishing an SSL connection between the client and the proxy. Using the session identifier or ticket, the proxy may send a client/proxy hello message to the server to establish an SSL connection (e.g., the identified secure connection) between the proxy and the server.

This pre-emptive SSL handshake (e.g., based on the parsed DNS request) between the proxy and the server may speed up the SSL session establishment process, regardless of whether SSL reuse is available for the session establishment between the proxy and the server. In some embodiments, by using the session identifier or ticket, the proxy may reuse the session identifier or a session ticket to establish an SSL connection between the proxy and the server. The client/proxy hello message may include the session identifier or the session ticket cached by the proxy. In addition, the DNS request from the client may reach the server. In some embodiments, the server in turn may send a server hello message and/or the session identifier or the session ticket back to the proxy. In certain embodiments, the server does not send the session identifier or the session ticket back to the proxy. The server may respond to the client/proxy hello message with an SSL certificate to the proxy for the proxy to validate. In some embodiments, the server does not send the SSL certificate to the proxy, as the SSL certificate may have been cached at the proxy from a prior session, and may already have been validated. Therefore, the SSL certificate may not have to be validated at the proxy during the handshake for establishing the SSL session between the proxy and the client.

In some embodiments, there is no cached or prior session identifier or session ticket to use (or reuse) for the establishment of the SSL session between the proxy and the server. The proxy may send a client/proxy hello message to the server, prior to the client sending a SSL connection request or a client hello message for establishing an SSL connection with the server and/or the proxy. The proxy may send a client/proxy hello message to the server based on the parsed DNS request, and/or responsive to determining or predicting that the client is to establish a session with the server. This pre-emptive SSL handshake (e.g., based on the parsed DNS request) between the proxy and the server may speed up the SSL session establishment process. The proxy may send a client/proxy hello message with the session identifier set to a null or empty value. At around this time, the DNS request from the client may reach the server. In certain embodiments, the server may send a server hello message, the session identifier set to a specified value, and/or the SSL certificate, to the proxy. One or more of these may then be stored or cached by the proxy. The client may send a client hello message to the proxy, e.g., prior to or at around the time the proxy receives from the server the server hello message, the session identifier set to a specified value, and/or the SSL certificate. The proxy may receive the session identifier and may be ready to send a client key exchange message to the server. At around the same time, the proxy may receive the client hello message from the client.

For example, simultaneously or after the server has sent the SSL certificate, the client may send a client hello message to the proxy. At this point, the proxy may have the session information (e.g., session identifier or ticket, and/or the SSL certificate) for the SSL connection and may be ready to send the client key exchange to the server. In this manner, with the SSL session information received and/or cached at the proxy, the proxy may quickly establish an SSL session with the client via an abbreviated handshake. For instance, the SSL certificate may be reused and may not have to be validated (e.g., by the client) to establish the SSL session with the client. For example, the SSL certificate may have been validated in the prior session establishment between the proxy and the server. The SSL session information for session re-use may thus decrease the connection setup/initialization time and/or session key computation time. In a non-transparent (or opaque) Transmission Control Protocol (TCP) connection with different Internet Protocol addresses and port tuples, the same connection or session information (e.g., session identifier or session ticket) may be re-used to establish the connection (e.g., between the client and the proxy, and/or between the proxy and the server). In a transparent TCP connection, a new SSL connection with the re-used session identifier may be used to establish the connection (e.g., between the client and the proxy, and/or between the proxy and the server).

The present systems and methods may thus decrease round/return-trip time (RTT) for every re-used SSL connection as the SSL certificates are not exchanged and/or re-validated between devices for instance. Certain handshake operations, such as sending a SSL certificate between devices, may be simplified, avoided or eliminated, thereby eliminating or saving on the associated RTTs or transmission times. Furthermore, the computation time of client keys for SSL certificates may be reduced. By reducing RTT and computation time, the overall SSL connection (e.g., between the client and the server, comprising the client-side session and the server-side session) may be established at a faster time and may be result in better Quality of Experience (QoE). In addition, as the SSL session timeout value may be larger than DNS time-to-live (TTL) value, the proxy may maintain the secure/SSL session, even after the SSL session has timed out.

Figure 7A:
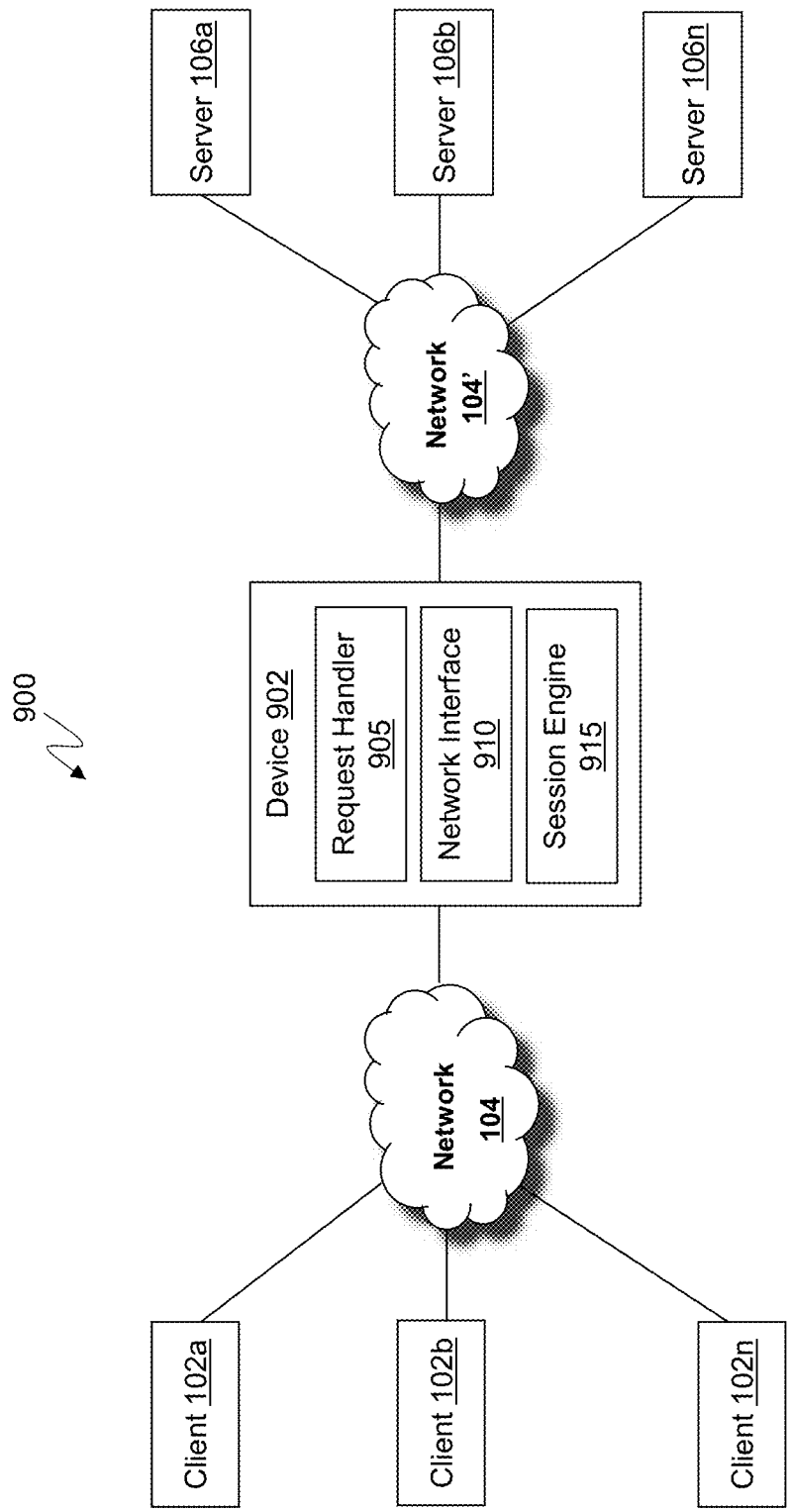
FIG. 7A is a block diagram of an embodiment of a system for establishing at least one secure connection for a session.

Referring now to FIG. 7A, depicted is a block diagram of an embodiment of a system 900 for establishing at least one secure connection for a session. In brief summary, the system 900 may include a plurality of client devices 102a-n, a device 902, and a plurality of servers 106 a-n 106. The device 902 may include a request handler 905, a network interface 910, and a session engine 915 executed thereon. The device 902 may comprise features of any embodiment of the devices 200, described above in connection with at least FIGS. 1A-1C, 2, and 4. Each of the above-mentioned elements or entities is implemented in hardware, or a combination of hardware and software, in one or more embodiments. For instance, each of these elements or entities can include any application, program, library, script, task, service, process or any type and form of executable instructions executing on hardware of the device 200. The hardware includes circuitry such as one or more processors in one or more embodiments.

The systems and methods of the present solution may be implemented in any type and form of device, including clients, servers and appliances. As referenced herein, a "server" may sometimes refer to any device in a client-server relationship, e.g., a device 902 in a handshake with a client device 102a-n. The present systems and methods may be implemented in any intermediary device or gateway, such as any embodiments of the devices 200 described herein. Some portion of the present systems and methods may be implemented as part of a packet processing engine and/or virtual server of an appliance, for instance. The systems and methods may be implemented in any type and form of environment, including multi-core devices, virtualized environments and/or clustered environments described herein.

The request handler 905 may intercept a domain name service (DNS) request from a client 102a-n. In some embodiments, the request handler 905 may receive the DNS request from the client 102a-n. The DNS request may be sent by the client 102a-n via the network 104 or 104'. In some embodiments, the DNS request may be any type of DNS query, such as a recursive query, a non-recursive query, or an inverse query. The DNS request may include request information, such as an address of a requested resource and a device identifier corresponding to the requesting client 102a-n, among other information. In some embodiments, the address may include an alphanumeric string (e.g., a Uniform Resource Locator (URL) with a host name and a file pathname, an Internet Protocol (IP) address, etc.). The address may correspond to or reference a server 106a-n. The device identifier may include an alphanumeric string corresponding to the client 102a-n. (e.g., an IP address or a media access control (MAC) address, etc.)

Although illustratively discussed using a DNS request, certain embodiments of the proxy can intercept/receive and/or process (e.g., parse, evaluate or analyze, by the request handler 905) one or more of any type(s) of DNS messages, including a DNS response from a DNS server to the client.

To determine whether a session is to be established between the client 102*a-n* and the server 106*a-n*, the request handler 905 may parse the DNS request sent from the client 102*a-n*. The request handler 905 may parse the DNS request for the request information. The request handler 905 may identify the address from the request information included in the DNS request. Using the identified address, the request handler 905 may identify the server 106*a-n* corresponding the address included in the DNS request. The request handler 905 may also identify the device identifier from the request information included in the DNS request.

With the request information parsed from the DNS request, the request handler 905 may also compare the configuration data for the device 902. The configuration data may include an SSL profile of the client 102*a-n*, an SSL profile of the server 106*a-n*, historical data gathered about the connections of the client 102*a-n*, and/or historical data gathered about the connections of the server 106*a-n*, among others. In some embodiments, the configuration data may be stored on memory on the device 902 or at a database in communication with the device 902. The SSL profile of the client 102*a-n* may include: a device identifier corresponding to the client 102*a-n*, a number of interactions of the client (e.g., an interaction between the client 102*a-n* and the device 902) to access a resource on the server 106*a-n*, and a key exchange state between the client 102*a-n* and the device 902, among others. The SSL profile of the server 106*a-n* may include: an address corresponding to the server 106*a-n*, a number of interactions between the server 106*a-n* and the device 902 to for instance provide access to a hosted resource to the client 102*a-n*, and a key exchange state between the server 106*a-n* and the device 902, among others. The historical data gathered about the connections of the client 102*a-n* may include: a number/frequency/statistic of connections (and/or types of connections) made between the client 102*a-n* and the device 902 among others. The historical data gathered about the connections of the server 106*a-n* may include a number/frequency/statistic of connections (and/or types/characteristics of connections) made between the server 106*a-n* and the device 902, among others. Based on the parsed DNS request and the configuration data of the device 902, the request handler 905 may determine whether the client 102*a-n* is preparing (or likely to be preparing) to establish a session with a server 106*a-n*.

By way of illustration, and not intended to be limiting in any way, the request handler 905 may, using the device identifier e.g., (parsed from a DNS message) corresponding to the client 102*a-n*, identify the SSL profile of the client 102*a-n* and/or the historical data gathered about the connections of the client 102*a-n*. From the SSL profile of the client 102*a-n*, the request handler 905 may determine whether the number of past or recent (e.g., within a specified period of time) interactions between the client 102*a-n* and the device 902 to access the resource on the server 106*a-n* is greater than zero. If the number of interactions is greater than zero, there may be an SSL connection previously or presently established between the client 102*a-n* and the device 902, and the request handler 905 may permit the continuation of the SSL connection using a previous session identifier or session ticket. In some embodiments, if the number of interactions is zero, the request handler 905 may determine that the client 102*a-n* is preparing to establish an SSL session with the server 106*a-n*.

In some embodiments, from the SSL profile of the client 102*a-n*, the request handler 905 may determine whether an encryption key (e.g., Diffie-Hellman key, Ephemeral RSA key) has been exchanged between the client 102*a-n* and the device 902. If an encryption key has been exchanged, there may be an SSL connection previously or presently established between the client 102*a-n* and the device 902 and the request handler 905 may permit the continuation of the SSL connection(s) using a previously assigned or established session identifier or session ticket. On the other hand, and in certain embodiments, if an encryption key has not been exchanged indicating that no SSL connection is presently or previously established, the request handler 905 may determine that the client 102*a-n* is preparing to establish an SSL session with the server 106*a-n*.

In some embodiments, from the historical data gathered about the connections of the client 102*a-n*, the request handler 905 may determine the number and/or types of connections between the client 102*a-n* and the device 902. If the number of connections is greater than zero, there may have been an SSL connection previously established between the client 102*a-n* and the device 902 and the request handler 905 may permit the continuation of the SSL connection. using a previously assigned or established session identifier or session ticket If the number of connections is zero, the request handler 905 may determine that the client 102*a-n* is preparing to establish an SSL session with the server 106*a-n*, in one or more embodiments. In some embodiments, if there is a type and/or version of connection (e.g., SSL VPN) that the client has always or typically established with the server (or other servers), the request handler 905 may determine that the client 102*a-n* is preparing to establish an SSL VPN session with the server 106*a-n*. The type of connection may include a non-secure connection or a secured connection, such as a SSL connection (e.g., a SSL VPN connection) using a particular version of SSL and/or encryption for instance.

Using the address referencing the server 106*a-n* (e.g., as parsed from a DNS message), the request handler 905 may identify the SSL profile of the server 106*a-n* and/or the historical data gathered about the connections of the server 106*a-n*. From the SSL profile of the server 106*a-n*, the request handler 905 may determine the type(s) of prior connection(s) for the server, and/or whether the number of interactions between the server 106*a-n* and the device 902 to provide access to a hosted resource to the client 102*a-n* is greater than zero. Based on the determination of the number, characteristics and/or types of connections, the request handler 905 may permit the continuation of the SSL connection(s) using a previously assigned or established session identifier or session ticket for instance. As an example, if the number of interactions is greater than zero, there may be an SSL connection already established between the server 106*a-n* and the device 902 and the request handler 905 may permit the continuation of the SSL connection(s) using a previously assigned or established session identifier or session ticket. If the number of interactions is zero, the request handler 905 may determine that the client 102*a-n* is preparing to establish an SSL session with the server 106*a-n*. In some embodiments, if the request handler determines that there is a type and/or version of connection (e.g., SSL VPN) that the server has always or typically established with the client (or other clients), the request handler 905 may determine that an SSL VPN session is to be established with the server 106*a-n*.

In some embodiments, from the SSL profile of the server 106a-n, the request handler 905 may determine whether an encryption key (e.g., Diffie-Hellman key, Ephemeral RSA key) has been exchanged between the server 106a-n and the device 902 and/or the client 102a-n. If an encryption key has been exchanged, there may be an SSL connection already established between the server 106a-n and the device 902 and the request handler 905 may permit the continuation of the SSL connection(s) using a previously assigned or established session identifier or session ticket. On the other hand, if an encryption key has not been exchanged indicating that no SSL connection is presently established, the request handler 905 may determine that the client 102a-n is preparing to establish an SSL session with the server 106a-n.

In some embodiments, from the historical data gathered about the connections of the server 106a-n, the request handler 905 may determine the number, characteristics and/or types of connections between the server 106a-n and the device 902. Based on the determination of the number, characteristics and/or types of connections, the request handler 905 may permit the continuation of the SSL connection(s) using a previously assigned or established session identifier or session ticket for instance. As an example, if the number of connections is greater than zero, there may have been an SSL connection previously established between the server 106a-n and the device 902 and the request handler 905 may permit the continuation of the SSL connection(s) using a previously assigned or established session identifier or session ticket. If the number of connections is zero, the request handler 905 may for instance determine that the client 102a-n is preparing to establish an SSL session with the server 106a-n.

If the request handler 905 determines that the client 102a-n is preparing to establish an SSL session with the server 106a-n, the network interface 910 may send a client/proxy hello message to the server 106a-n to establish a secure connection between the device 902 and the server 106a-n for the session. The client hello message of the device 902 may be sent to the server 106a-n by the network interface 910, prior to the client 102a-n initiating a SSL request or handshake, e.g., prior to the client sending a client hello message of the client 102a-n for establishing a secure connection between the client 102a-n and the device 902. In certain embodiments, the client hello message of the device 902 may include session information for reuse, such as a session identifier or a session ticket, among others, established or used for a prior session. The session information may be used by the network interface 910 to perform session re-use techniques. In this manner, the device 902 may initiate a SSL handshake prior to the client 102a-n initiating a SSL request, and/or quickly establish a SSL session upon initiation from the client 102a-n.

In some embodiments, the network interface 910 may generate or set the session identifier to a specified value. In some embodiments, the client hello message of the device 902 may include a session identifier set to an empty, zero, or null value. The server 106a-n may be configured to recognize and respond to a session identifier set to an empty, zero or null value. For instance, receipt of the client hello message of the device 902 set to the empty, zero or null value may cause the server 106a-n to set the session identifier to a specified value for enabling session reuse of a session identifier or session ticket. In some embodiments, the network interface 910 may receive the specified value of the session identifier from the server 106a-n. Receipt or setting of the specified value of the session identifier may be prior to or concurrent with receipt of the client hello message of the client 102a-n at the device 902.

Once the session information is received or set, the session engine 915 may continue in establishing the secure session between the device 902 and the server 106a-n. The secure session between the device 902 and the server 106a-n may be established by performing a SSL handshake, which includes sending the client hello and server hello messages. The secure session between the device 902 and the server 106a-n may be used to provide the client 102a-n access to a resource hosted on the server 106a-n. Subsequent to sending the client hello message of the device 902 to the server 106a-n, the session engine 915 may receive a server hello message from the server 106a-n. In conjunction with the server hello message, the session engine 915 may also receive a certificate message including an SSL certificate, a server key exchange message including an encryption key, and/or a server hello done message from the server 106a-n. Upon receipt of the SSL certificate from the server 106a-n, the session engine 915 may validate the SSL certificate using SSL certificate verification or checking techniques, such as involving a certificate authority. The session engine 915 may apply various encryption algorithms to validate the SSL certificate, to generate an encryption key, and to apply a change cipher specification (or spec) in negotiating security settings for the secure session established between the device 902 and the server 106a-n.

To complete establishment of the secure session between the device 902 and the server 106a-n, the session engine 915 may send a certificate verification message to the server 106a-n. The session engine 915 may also transmit a client key exchange message including an encryption key, change cipher spec message to the server 106a-n, and/or a finish message to the server 106a-n. With the establishment of the secure session between the device 902 and the server 106a-n complete, the device 902 and the server 106a-n may continue to exchange application data and messages, such as HTTP requests from the device 902 and HTTP responses from the server 106a-n, among others.

Once the secure connection between the device 902 and the server 106a-n is established, the network interface 910 may generate or set the session ticket using a session state of a secure connection between the device 902 and the server 106a-n. In some embodiments, the session ticket may be received by the session engine 915 from the server 106a-n subsequent to sending of the client key exchange message, change cipher spec message, and/or the client finish message to the server 106a-n. The session state may include an encryption code (e.g., cipher suite or master secret) generated or determined by the server 106a-n.

Concurrent to establishment of the secure session between the device 902 and the server 106a-n, the session engine 915 may establish a secure session between the client 102a-n and the device 902. The secure session between the client 102a-n and the device 902 may be established by performing an abbreviated SSL handshake by using (or re-using) the session information exchanged between the device 902 and the server 106a-n. The session information exchanged between the device 902 and the server 106a-n used to establish the secure session between the client 102a-n and the device 902 may include the session identifier or the session ticket. By performing an abbreviated SSL handshake between the client 102a-n and the device 902 in conjunction with an SSL handshake between the device 902 and the server 106a-n, the session engine 915 may significantly reduce the round-trip time (RTT) of certain handshake steps by eliminating and/or simplifying certain steps, and thus the initiation time consumed to establish the two secured sessions between the client 102a-n and the device 902 and between the device 902 and the server 106a-n.

Subsequent to the network interface 910 or the session engine 915 sending the client hello message of the device 902 to the server 106a-n, the session engine 915 may have received a client hello message of the client 102a-n from the client 102a-n. In some embodiments, the client hello message of the client 102a-n may include session information (e.g., session identifier) used in a previous session. In some embodiments, the session engine 915 may in turn transmit a server hello message of the device 902 to the client 102a-n including session information (e.g., session identifier and session ticket). In some embodiments, the server hello message of the device 902 may be sent prior to validation of the SSL certificate from the server 106a-n. In some embodiments, the server hello message of the device 902 to the client 102a may be sent subsequent to the validation of the SSL certificate from the server 106a-n. In some embodiments, the server hello message of the device 902 may be sent subsequent to sending of a client key exchange message of the device 902 including the encryption key, a change cipher spec message to the server 106a-n, and/or the finish message to the server 106a-n. The server hello message of the device 902 may include the encryption key(s), the session identifier, and/or the session ticket, among others. The session identifier and/or the session ticket may be included in the server hello message of the device 902 to avoid the session engine 915 from transmitting the SSL certificate to the client 102a-n.

Once the server hello message of the device 902 is received, the client 102a-n may apply various encryption algorithms to apply a change cipher suite in negotiating security settings for the secure session established between the client 102a-n and the device 902. The client 102a-n may in turn send another message with the session information from the device 902 or new session information (e.g., new session identifier) to continue with establishing the session between the device 902 and the client 102a-n. If the session information is new, the session engine 915 may instead apply the full handshake process. If the session information is reused from the device 902, the session engine 915 may continue with the abbreviated handshake process. The session engine 915 may receive a change cipher spec message and/or a finish message from the client 102a-n, thereby completing the abbreviated SSL handshake.

When the same session information is used to execute, implement or complete the abbreviated SSL handshake, if the secure session to be established between the client 102a-n and the device 902 is an opaque Transmission Control Protocol (TCP) connection (e.g., one with different IP and/or port addresses), the client 102a-n may use the same session ticket as the one used to establish the secure session between the device 902 and the server 106a-n. If the secure session to be established is a transparent TCP connection (e.g., one with the same IP and/or port addresses), the client 102a-n may use the same session identifier as the one used to establish the secure session between the device 902 and the server 106a-n. In either scenario, as the session information used to establish the connection between the client 102a-n and the device 902 is the same as to establish the connection between the device 902 and the server 106a-n, the client 102a-n and the device 902 may avoid exchanging encryption keys or validating SSL certificates, thereby decreasing computation resources and time spent at both the client 102a-n and the device 902 (e.g., via the abbreviated handshake process).

With the establishment of the secure session between the client 102a-n and the device 902 complete, the client 102a-n and the device 902 may continue to exchange application data and messages, such as HTTP requests from the device 902 and HTTP responses from the server 106a-n, among others. In some embodiments, the device 902 may receive an HTTP request (e.g., GET, PUSH, or POST) from the client 102a-n via the secure session established between the client 102a-n and the device 902. The device 902 may in turn forward the HTTP request to the server 106a-n using the secure session established between the device 902 and the server 106a-n. Subsequently, the device 902 may receive a HTTP response (e.g., 2xx Success and 3xx Redirection) from the server 106a-n via the secure session established between the device 902 and the server 106a-n. The device 902 may in turn forward the HTTP response received from the server 106a-n to the client 102a-n, using the secure session established between the device 902 and the server 106a-n.

Figure 7B:
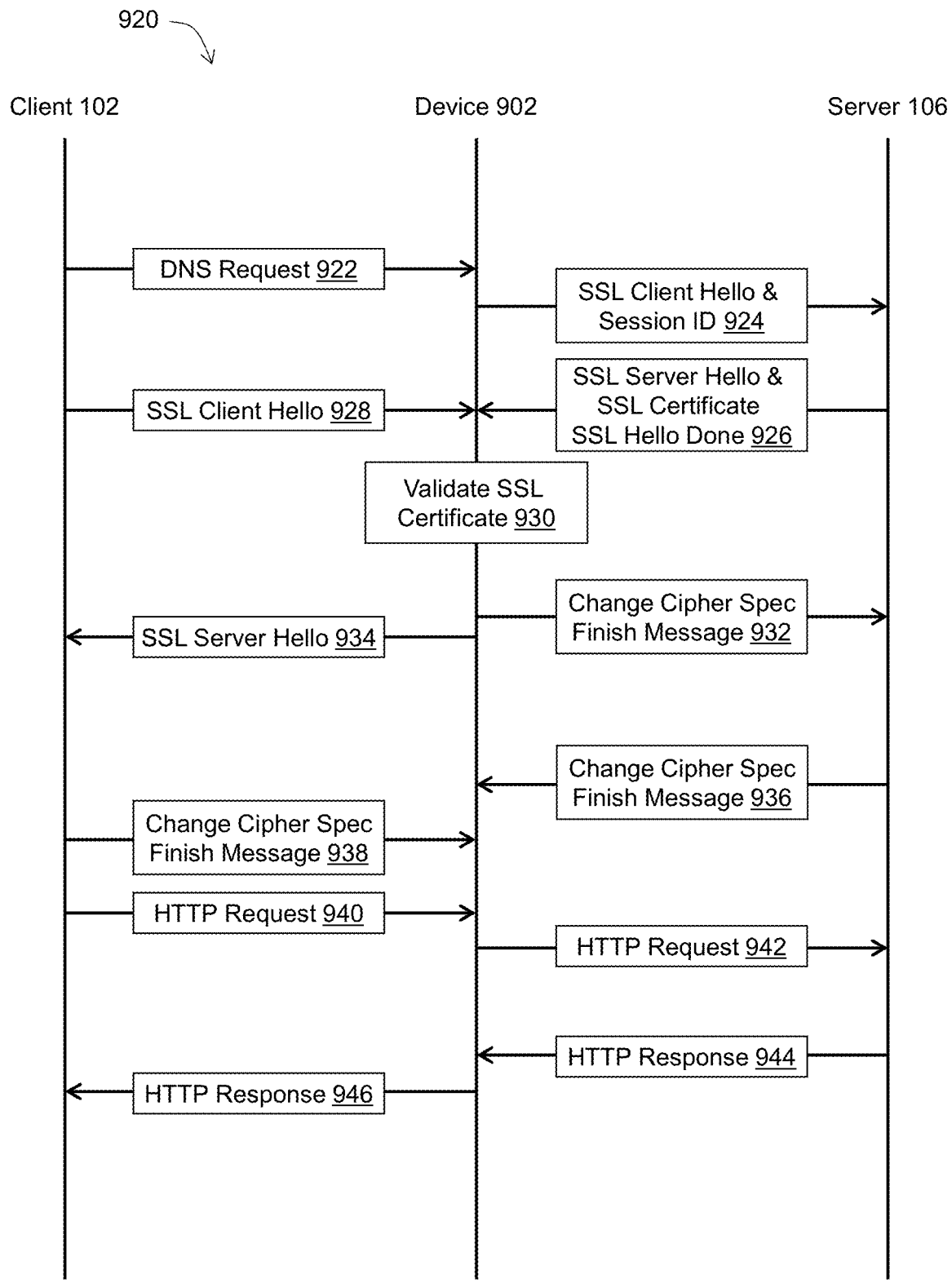
FIG. 7B is a flow chart of a signal sequence for establishing one secure connection for a session.

Referring now to FIG. 7B, shown is a flow chart of a signal sequence 920 for establishing one or more secure connections for a session. The operations and functionalities of signal sequence 920 may be implemented using the system 900 described above. In brief overview, the device 902 may receive a Domain Name System (DNS) request from the client 102 (922). The device 902 may send a Secured Socket Layer (SSL) client hello message with a session identifier to the server 106 (924). The device 902 may receive a SSL server hello message with the SSL certificate and the SSL hello done indicator (926). The device 902 may also receive the SSL client hello 928 from the client 102 (928). The device 902 may validate the SSL certificate (930). The device 902 may send a change cipher spec finish message to the server 106 (932). The device 902 may send a SSL server hello message to the client 102 (934). The device 902 may receive a change cipher spec finish message from the server 106 (936). The device 902 may receive a change cipher spec finish message from the client 102 (938). The device 902 may further receive an HTTP request (940). The device 902 may forward a HTTP request message to the server 106 (942). The device 902 may receive a HTTP response from the server 106 (944).

The device 902 may forward the HTTP response to the client 102 (946).

Referring to (922), and in some embodiments, device 902 (e.g., an appliance 200 or other element) may receive or intercept a Domain Name System (DNS) request or other DNS message from the client 102. The DNS request, for instance, may include an address referencing the server 106. The address may also reference a particular resource to be accessed by the client 102 hosted on the server 106. Once received or intercepted, the device 902 may parse the DNS request for the address and may identify the server 106 referenced by the address in the DNS request. The device 902 may then compare the configuration data of the device 902 with the parsed DNS request. The configuration data may include an SSL profile of the client 102, an SSL profile of the server 106, historical data gathered about the connections of the client 102, and/or historical data gathered about the connections of the server 106, among others. Based on the configuration data of the device with the information parsed from the DNS request, the device 902 may determine that the client 102 is preparing to establish a session with the server 106.

Referring to (924), and in some embodiments, device 902 may send a Secured Socket Layer (SSL) client hello message with a session identifier to the server 106. Having determined that the client 102 is preparing to establish a session with the server 106, the device 902 may send the SSL client hello message to start the SSL handshake process between the device 902 and the server 106. In some embodiments, the SSL client hello message of the device 902 may include the session information, such as the session identifier (set to a null, empty or zero value) or session ticket. The session information may be used to perform session re-use techniques.

Referring to (926), and in some embodiments, the device 902 may receive a SSL server hello message with the SSL certificate and the SSL hello done message. Receipt of the client hello message of the may cause the server 106 to set the session identifier to a specified value. The SSL server hello message may include the session identifier set by the server 106 to the specified value. In some embodiments, the device 902 may also receive a server key exchange message including an encryption key with the server hello message.

Referring to (928), and in some embodiments, the device 902 may also receive a SSL client hello message from the client 102. Receipt of the SSL client hello message of the client 102 by the device 902 may be prior to, concurrent to, or subsequent to receipt of the SSL server hello message of the server 106 by the device 902. In some embodiments, the receipt of the SSL client hello message of the client 102 may be prior to or subsequent to validation of the SSL certificate by the device 902 received from the server 106. In some embodiments, the SSL client hello message may include the session identifier used in a previous session with the device 902 or between the device 902 and the server 106. In some embodiments, the SSL client hello message may lack any session identifier.

Referring to (930), and in some embodiments, the device 902 may validate the SSL certificate. As part of the SSL handshake process between the device 902 and the server 106, the device 902 may apply various encryption techniques to verify or check the SSL certificate received from the server 106.

Referring to (932), and in some embodiments, the device 902 may send a change cipher spec finish message to the server 106. As part of the SSL handshake process between the device 902 and the server 106, the device 902 may also apply various encryption techniques to generate an encryption key for client key exchange. In some embodiments, the device 902 may also send a key exchange message including an encryption key of the device 902 to the server 106.

Referring to (934), and in some embodiments, the device 902 may send a SSL server hello message to the client 102. The SSL server hello message of the device 902 may include the session identifier used to establish the secure session between the device 902 and the server 106, such as the one set or received by the server 106. Using the same session identifier, an abbreviated SSL handshake process may take place between the client 102 and the device 902. Furthermore, as the session identifier is sent, the SSL server hello message may lack a SSL certificate or an encryption key. In this manner, the client may avoid the verification of such an SSL certificate or generation of such an encryption key, thereby reducing computation time at the client 102 and the device 902.

Referring to (936), and in some embodiments, the device 902 may receive a change cipher spec finish message from the server 106. With the receipt of the change cipher spec message form the server 106, the SSL handshake process may be complete and the secure session may be established between the device 902 and the server 106. In some embodiments, the device 902 may receive a separate finish message from the server 106.

Referring to (938), and in some embodiments, the device 902 may receive a change cipher spec finish message from the client 102. Concurrent to the change cipher spec finish message from the server 106, the device 902 may receive the change cipher spec finish message from the client 102. In some embodiments, the device 902 may receive a separate finish message from the client 102. With the receipt of the change cipher spec message from the client 102, the SSL handshake process may be complete and the secure session may be established between the client 102 and the device 902.

Referring to (940), and in some embodiments, the device 902 may further receive an HTTP request. The HTTP request may be one of a GET, POST, or PUT function. In some embodiments, other application data messages may be received by the device 902 from the client 102. Referring to (942), and in some embodiments, the device 902 may forward a HTTP request message to the server 106. The device 902 may send the HTTP request message received from the client 102 to the server 106. In some embodiments, other application data messages may be forwarded by the device 902 to the server 106.

Referring to (944), and in some embodiments, the device 902 may receive a HTTP response from the server 106. The device 902 may in turn receive a HTTP response message from the server 106. In some embodiments, other application data messages may be received by the device 902 from the server 106. Referring to (946), and in some embodiments, the device 902 may forward the HTTP response to the client 102. The device 902 may in turn forward the HTTP response to the client 102. In some embodiments, other application data messages may be forwarded by the device 902 to the client 102.

Figure 7C:
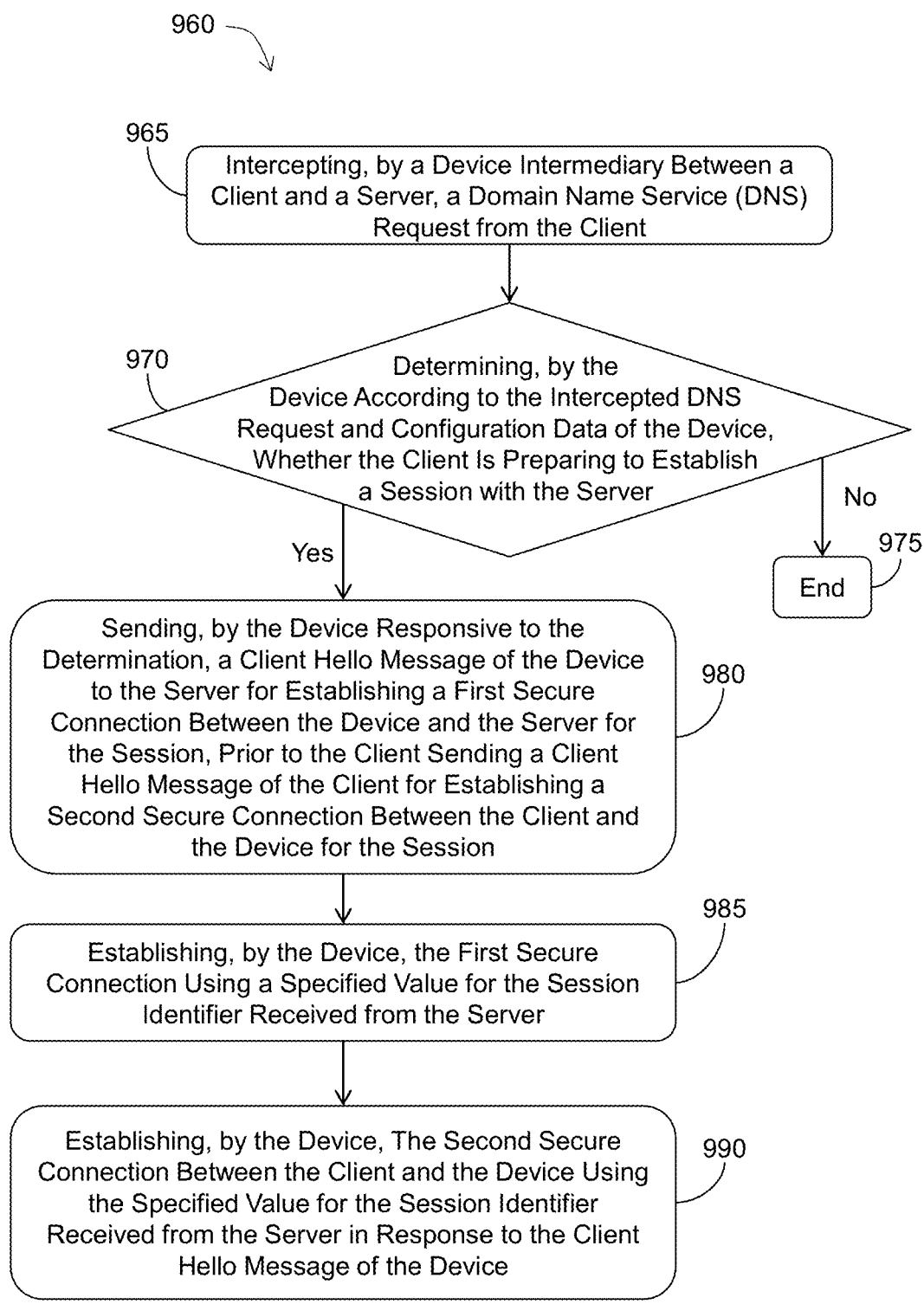
FIG. 7C is a flow diagram of an embodiment of a method for establishing at least one secure connection for a session.

Referring now to FIG. 7C, illustrated is a flow diagram of an embodiment of a method 960 for establishing at least one secure connection for a session. The operations and functionalities of method 960 may be implemented using the system 900 described above. In brief overview, a device intermediary between a client and a server may intercept a Domain Name Service (DNS) request from the client (965). The device may determine, according to the intercepted DNS request and configuration data of the device, whether the client is preparing to establish a session with the server (970). If not, method 960 may be terminated (975). If so, the device may send, responsive to the determination, a client hello message of the device to the server for establishing a first secure connection between the device and the server for the session, prior to the client sending a client hello message of the client for establishing a second secure connection between the client and the device for the session (980). The device may establish the first secure connection using a specified value for the session identifier received from the server (985). The device may establish the second secure connection between the client and the device using a specified value for a session identifier received from the server in response to the client hello message of the device (990).

Referring to (965), and in some embodiments, a device intermediary between a client and a server may intercept a Domain Name Service (DNS) request from the client. In some embodiments, the device may receive the DNS request from the client. The DNS request may be any type of DNS query, such as a recursive query, a non-recursive query, or an inverse query. The DNS request may include request information, such as an address of a requested resource and a device identifier corresponding to the requesting client, among other information. In some embodiments, the device may parse the DNS request to identify the address of the requested resource and/or the device identifier corresponding to the client.

Referring to (970), and in some embodiments, the device may determine, according to the intercepted DNS request and configuration data of the device, whether the client is preparing to establish a session with the server. To determine whether the client is preparing to establish the session with the server, the device may compare configuration data of the device with the information parsed from the DNS request. The configuration data may include an SSL profile of the client, an SSL profile of the server, historical data gathered about the connections of the client, and/or historical data gathered about the connections of the server, among others. Using the information parsed from the DNS request, the device may identify information from the configuration data corresponding to the client and/or the server. Based on the information parsed from the DNS request with the configuration data of the device, the device may determine, predict or assume that the client is preparing to establish a particular type of session (e.g., SSL session) with the server to access a resource hosted thereon.

Referring to (975), and in some embodiments, the method 960 may be terminated. In some embodiments, the intermediary device may continue with a session previously established between the device and the server and/or between the client and the device. In some embodiments, the intermediary device may terminate establishment of a session between the device and the server and/or between the client and the device. In some embodiments, the intermediary device may ignore the DNS request.

Referring to (980), and in some embodiments, the device may send, responsive to the determination, a client hello message of the device to the server for establishing a first secure connection between the device and the server for the session, prior to the client sending a client hello message of the client for establishing a second secure connection between the client and the device for the session. If the device determines that the client is preparing to establish a connection with the server based on the DNS request and the configuration data of the device, the device may send the hello message of the device to the server. In some embodiments, the hello message may include a session identifier set to empty or null. Receipt of the hello message with the session identifier set to empty or null may cause the server to set the session identifier to a specific value.

In some embodiments, the device may receive a server hello message of the server from the server. The server hello message may include the session identifier set to a specific value. The server hello message may be received by the device in conjunction with a certificate message including an SSL certificate, a server key exchange message including an encryption key, and/or a server hello done message from the server. Responsive to receipt of the SSL certificate from the server, the device may perform verification or checking techniques to verify the SSL certificate. In some embodiments, the device may receive a client hello message of the client from the client. Receipt of the server hello message of the server from the server may be concurrent to or prior to receipt of a client hello message of the client from the client.

Referring to (985), and in some embodiments, the device may establish the first secure connection using a specified value for the session identifier received from the server. The first secure connection may be established in accordance with (a full) SSL handshake protocol. Subsequent to validating the SSL certificate, the device may transmit a client exchange message including an encryption key, a change cipher spec finish message, and/or a finish message to the server. The device in turn may receive a change cipher spec finish message and/or a finish message from the server, thereby completing the SSL handshake process between the device and the server. In some embodiments, the device may receive or generate the session ticket based on a session status between the device and the server. Application data and/or messages may be exchanged between the device and the server over the first secure connection.

Referring to (990), and in some embodiments, the device may establish the second secure connection between the client and the device using the specified value for the session identifier received from the server in response to the client hello message of the device. The second secure connection between the client and the device may be established in accordance with an abbreviated SSL handshake protocol. The device may send a server hello message of the device to the client. The server hello message may include the session identifier or the session ticket used in the first secure connection established between the device and the client. In some embodiments, the server hello message may lack an SSL certificate and/or a server encryption key exchange, thereby avoiding validation of the SSL certificate and/or generation of encryption key at the client. The device may receive a change cipher spec finish message from the client, thereby completing the abbreviated SSL handshake process between the client and the device. Application data and/or messages may be exchanged between the device and the server over the second secure connection.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

The invention claimed is:

1. A method for establishing at least one secure connection for a session, the method comprising:
    intercepting, by a device intermediary between a client and a server, a domain name service (DNS) request from the client;
    determining, by the device according to the intercepted DNS request and configuration data of the device, that the client is preparing to establish a session with the server;
    sending, by the device responsive to the determination, a client hello message of the device to the server for establishing a first secure connection between the device and the server for the session, prior to the client sending a client hello message of the client for establishing a second secure connection between the client and the device for the session; and
    establishing the second secure connection between the client and the device using a specified value for a session identifier received from the server in response to the client hello message of the device.

2. The method of claim 1, wherein the determining comprises parsing the intercepted DNS request for information and comparing the information with the configuration data of the device.

3. The method of claim 1, wherein establishing the second secure connection comprises performing an abbreviated secure socket layer (SSL) handshake to establish the second secure connection between the client and the device.

4. The method of claim 3, wherein performing the abbreviated SSL handshake comprises avoiding to have the device transmit a SSL certificate of the device to the client for validation.

5. The method of claim 1, wherein the configuration data comprises at least one of: a SSL profile of the client or the server, or historical data gathered about connections of the client or the server.

6. The method of claim 1, wherein sending the client hello message of the device comprises sending the client hello message of the device with an empty or null value for the session identifier, to cause the server to set the session identifier to the specified value.

7. The method of claim 1, further comprising receiving, by the device, the specified value of the session identifier from the server, prior to or at a time the client hello message of the client is received at the device.

8. The method of claim 1, further comprising establishing the second secure connection between the client and the device using a session ticket that comprises a session state of the first secure connection.

9. The method of claim 1, further comprising establishing, by the device, the first secure connection using the specified value for the session identifier received from the server.

10. The method of claim 1, wherein establishing the second secure connection further comprises establishing the second secure connection by reusing the first secure connection established between the device and the server.

11. A system for establishing at least one secure connection for a session, the system comprising:
    a device intermediary between a client and a server, the device configured to:
        intercept a domain name service (DNS) request from the client;
        determine, according to the intercepted DNS request and the configuration data of the device, that the client is preparing to establish a session with the server;
        send, responsive to the determination, a client hello message of the device to the server for establishing a first secure connection between the device and the server for the session, prior to the client sending a client hello message of the client for establishing a second secure connection between the client and the device for the session; and
        establish the second secure connection between the client and the device using a specified value for a session identifier received from the server in response to the client hello message of the device.

12. The system of claim 11, wherein the device is further configured to parse the intercepted DNS request for information, and to compare the information with the configuration data of the device.

13. The system of claim 11, wherein the device is further configured to establish the second secure connection by performing an abbreviated secure socket layer (SSL) handshake.

14. The system of claim 13, wherein the device is further configured to perform the abbreviated SSL handshake by avoiding to have the device transmit a SSL certificate of the device to the client for validation.

15. The system of claim 11, wherein the configuration data comprises at least one of: a SSL profile of the client or the server, or historical data gathered about connections of the client or the server.

16. The system of claim 11, wherein the device is further configured to send the client hello message of the device with an empty or null value for the session identifier, to cause the server to set the session identifier to the specified value.

17. The system of claim 11, wherein the device is further configured to receive the specified value of the session identifier from the server, prior to or at a time the client hello message of the client is received at the device.

18. The system of claim 11, wherein the device is further configured to establish the second secure connection between the client and the device using a session ticket that comprises a session state of the first secure connection.

19. The system of claim 11, wherein the device is further configured to establish the first secure connection using the specified value for the session identifier received from the server.

20. The system of claim 11, wherein the device is further configured to establish the second secure connection by reusing the first secure connection established between the device and the server.

* * * * *